(12) United States Patent
Bradford et al.

(10) Patent No.: US 7,344,044 B2
(45) Date of Patent: Mar. 18, 2008

(54) PARTITION ASSEMBLY HAVING FLOOR PARENT WELDED TO PARTITIONS

(75) Inventors: Judson A. Bradford, Holland, MI (US); Calvin D. Nyeboer, Holland, MI (US); Mark J. Feenstra, Grand Haven, MI (US)

(73) Assignee: Bradford Company, Holland, MI (US)

( * ) Notice: Subject to any disclaimer, the term of this patent is extended or adjusted under 35 U.S.C. 154(b) by 189 days.

(21) Appl. No.: 11/183,538

(22) Filed: Jul. 18, 2005

(65) Prior Publication Data

US 2006/0157489 A1 Jul. 20, 2006

Related U.S. Application Data

(63) Continuation-in-part of application No. 11/036,809, filed on Jan. 14, 2005.

(51) Int. Cl.
*B65D 1/24* (2006.01)
*B65D 1/36* (2006.01)
*F25D 23/00* (2006.01)

(52) U.S. Cl. .................... 220/552; 220/592.2; 220/507

(58) Field of Classification Search .............. 220/552, 220/62, 62.1, 510, 507, 592.26; 229/120.13, 229/120.06, 120.07, 120.25
See application file for complete search history.

(56) References Cited

U.S. PATENT DOCUMENTS

| | | | |
|---|---|---|---|
| 2,647,679 A | 8/1953 | Schilling et al. | 229/15 |
| 3,399,098 A | 8/1968 | Omoto et al. | 156/200 |
| 3,859,161 A | 1/1975 | McLeod | 161/44 |
| 3,921,891 A | 11/1975 | Gorham | 229/15 |
| 4,127,304 A | 11/1978 | Gardner | 229/15 |
| 4,224,376 A | 9/1980 | Ishige et al. | 428/315 |
| 4,375,263 A | 3/1983 | Dworkin | 206/425 |
| 4,898,640 A | 2/1990 | O'Connor | 156/204 |
| 5,732,876 A | 3/1998 | Bradford | 229/120.07 |
| 5,785,239 A * | 7/1998 | Campbell et al. | 229/120.36 |
| 5,788,146 A * | 8/1998 | Bradford et al. | 229/120.07 |
| 5,876,813 A | 3/1999 | Bambara et al. | 428/36.5 |
| 5,882,776 A | 3/1999 | Bambara et al. | 428/215 |
| 5,904,798 A | 5/1999 | Bradford et al. | 156/309 |
| 5,938,878 A | 8/1999 | Hurley et al. | 156/219 |
| 6,054,005 A * | 4/2000 | Hurley et al. | 156/219 |
| 6,167,790 B1 | 1/2001 | Bambara et al. | 83/13 |
| RE38,707 E | 3/2005 | Merkel | |
| 6,910,582 B2 * | 6/2005 | Lantz | 206/593 |
| 2004/0118854 A1 * | 6/2004 | Kutun | 220/507 |

FOREIGN PATENT DOCUMENTS

JP         404065235 A    3/1992    ............... 156/242

* cited by examiner

*Primary Examiner*—Anthony D. Stashick
*Assistant Examiner*—Shawn M. Braden
(74) *Attorney, Agent, or Firm*—Wood, Herron & Evans, LLP

(57) ABSTRACT

A non-disassembling partition assembly comprising a partition matrix made up of intersecting first and second slotted partitions, each of the partitions having at least one slot. The slots of the partitions are engaged with each other at a plurality of intersections. The partitions may be made by folding over a partition blank and securing a foam portion of the folded partition blank to itself. The foam may be heated before being cooled under pressure to secure opposed plies of the partition together. The partition assembly is held together by a floor parent welded to the intersecting partitions. The floor has a lower outer skin and a foam layer to which the partitions are parent welded.

22 Claims, 15 Drawing Sheets

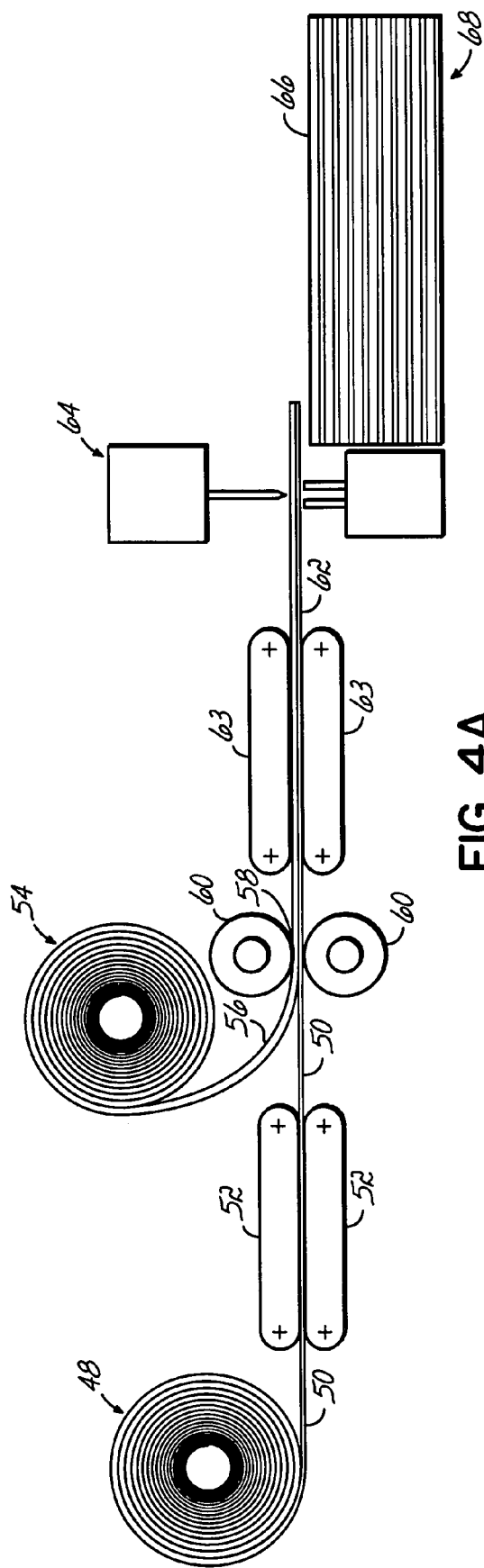
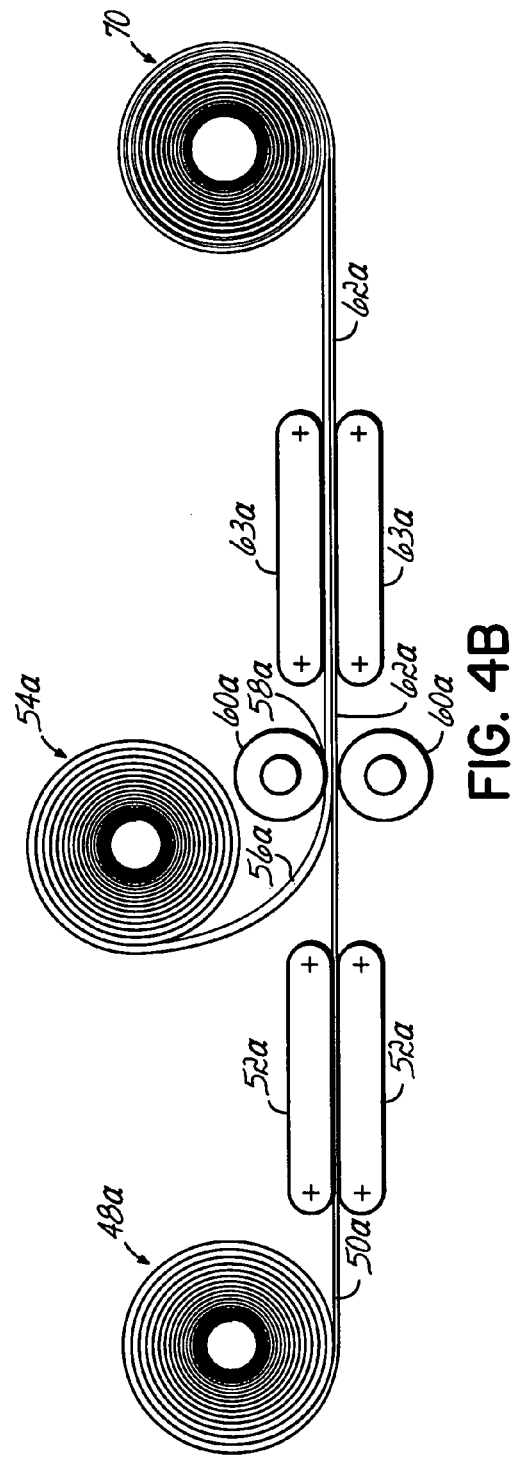
FIG. 4A
FIG. 4B

FIG. 5C1

PARTITION ASSEMBLY HAVING FLOOR PARENT WELDED TO PARTITIONS

CROSS-REFERENCE TO RELATED APPLICATIONS

This application is a Continuation-in-Part of U.S. patent application Ser. No. 11/036,809 filed Jan. 14, 2005 entitled "Partition Assembly Made With Multiple Ply Partitions", which is fully incorporated by reference herein.

FIELD OF THE INVENTION

The present invention relates to a partition assembly for dividing the space inside a container or box; more particularly to a partition assembly made of slotted, multiple ply partitions.

DESCRIPTION OF THE PRIOR ART

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual holding cells each of which is intended to hold a separate item for display and/or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of holding cells. The dividers are slotted in a manner that enables the dividers to engage with one another at the location of the slots so that the dividers form an orthogonal grid or matrix. Typically the dividers are made of the same material as the material of the box or container, plastic or paperboard. However, the dividers may be constructed of any suitable material with sufficient rigidity to prevent the contents of the container from contacting one another and being damaged.

One disadvantage with known partition assemblies is that the upper edges of the partitions may have exposed sharp edges. For example, corrugated plastic partitions may have sharp upper edges created by cutting a sheet of corrugated plastic to the desired partition size. Such an exposed upper edge of the partition may damage products or parts being loaded into or unloaded from the cells of the container in which is located the partition matrix or assembly. Partition assemblies incorporating partitions having exposed sharp upper edges may require additional clearance between the parts being either loaded or unloaded and the upper edges of the partitions.

Another disadvantage of such partition assemblies is that the person loading or unloading parts or products into or from the cells of the container may cut or scrape their knuckles or hands on the exposed upper edges of the partitions when loading or unloading parts or products.

Additionally, the stiffness of the partitions of the assembly is dictated by the material from which the partitions are made. The stiffness of the partitions may not be altered without changing the material from which the partition is made.

U.S. Pat. No. 2,647,679 discloses a partition assembly which separates the interior of a box or container into a plurality of cells. The partitions of the assembly disclosed in this patent are formed by folding a blank of material along a fold line so as to create a rounded smooth upper edge. The material is disclosed as being paper board or similar material.

Another partition assembly for dividing the interior of a container is disclosed in U.S. Pat. No. 4,375,263. The partitions of this assembly are similarly rounded along their upper edges and are made of transparent vinyl sheets.

In each of these prior art partition assemblies, the opposed plies of the dividers or partitions formed by folding a blank of material are not secured to each other. Consequently, the opposed sides or plies of the partitions are not secured to each other and may be easily separate, thereby expanding into the cells of the container defined by the partition assembly. Consequently, the partitions may contact the products or parts stored in the cells and damage them. Additionally, the partition plies may easily tear or otherwise be damaged. Upon assembly or disassembly of the partition matrix, one or more portions of the partitions may tear and hence cause disassembly of at least a portion of the partition matrix.

U.S. Pat. Nos. 5,732,876 and 5,788,146 disclose partition assemblies made of plastic partitions, each partition assembly being parent welded to a supporting net to create a non-disassembling partition assembly which may be used outside a box or container. Related U.S. Pat. No. 5,904,798 discloses methods of making such non-disassembling partition assemblies. However, the supporting net of such non-disassembling partition assemblies may permit objects to pass through it. Additionally, it may be difficult to parent weld partitions made partially or entirely of foam to a plastic supporting net.

Therefore, it has been an objective of the present invention to provide methods of manufacturing non-disassembling partition assemblies made with partitions made at least partially of foam.

It has been another objective of the present invention to provide a non-disassembling partition assembly having a solid floor through which objects may not pass.

SUMMARY OF THE INVENTION

The partition assembly of the present invention which accomplishes these objectives comprises at least one first slotted partition intersecting with at least one second slotted partition at an intersection. The intersecting first and second slotted partitions form a plurality of holding cells into which different parts are stored for shipment or display.

Each first slotted partition has at least one slot extending inwardly from an edge of the first slotted partition. Likewise each second slotted partition has at least one slot extending inwardly from an edge of the second slotted partition. Preferably the slots are evenly spaced in order to make the holding cells which are defined by the intersecting partitions of identical dimensions. However, the slots may be located at any desired locations. In one embodiment, each of the slots of a first slotted partition extends inwardly from an edge of the first slotted partition to approximately the midpoint of the first slotted partition. Each of the slots of a second slotted partition extends inwardly from an edge of the second slotted partition to approximately the midpoint of the second slotted partition.

In one embodiment of the present invention, the partition is formed of a multilayered material folded in half and secured to itself. The fold creates a rounded upper edge at the fold line which is smooth and has a continuous surface with the outer side walls or skins of the partition. The partition blank comprises an inner layer of foam, preferably polyolefin foam, and an outer layer, skin or facegood. In one embodiment, the inner foam layer is bonded directly or laminated to the outer layer. The outer layer may be made of woven polyester, non-woven polypropylene, foamed or solid polyolefin or other material such as latex or non-polyolefin plastic. The outer layer may be selected as appropriate to protect or prevent surface damage to the products being stored and/or shipped in the cells of the container.

In an alternative embodiment, a desired stiffness or rigidity may be created in the partition by inserting into the partition blank from which the partition is made a thin plastic skin or middle layer between the inner foam layer and the outer layer or facegood. By altering the thickness and/or mechanical properties of this middle layer, or by omitting it altogether, the desired level or degree of stiffness of the partition may be achieved during the manufacturing process.

In an alternative embodiment, the partition blank may be made solely of one foam layer without any outer layer or facegood.

The method of manufacturing the multiple ply partition comprises multiple steps. Although the method is described with respect to one preferred embodiment, the method may be used with any of the embodiments contemplated by this invention.

In one instance, a multiple layered partition strip or blank having an outer skin secured to a foam interior is first provided. This partition blank may be made using any desired known method such as co-extrusion, lamination, etc.

The partition blank is folded so as to create two opposed plies and a smooth edge connecting the plies. The foam interior layer of at least one of the plies is heated with a heat source. The heat source is placed in such proximity to the contacting portions of the partition plies so that heat from the heat source causes the foam portion of at least one of the partition plies to become at least partially molten. The heat source is then distanced from the partition plies and the foam portions of the partition plies allowed to cool under pressure, thereby creating a securement of the foam layers or portions of the partition plies to create a unitary partition having a foam interior portion surrounded by an outer skin. The heat source may be hot air or any other suitable heat source.

In this manner, the plies of the partition are parent welded or fused together along their interior or inner surfaces. For purposes of this document, the term "parent weld" or "parent weldment" refers to a weldment of two contacting partition plies welded, fused or secured together without the use of any additional material other than the material of the partition plies themselves. The present invention is not intended to be limited strictly to foam, partition plies made of corrugated plastic may be parent welded together in accordance with the present invention in a manner disclosed and taught in assignee's U.S. Pat. No. 5,788,146, which is fully incorporated herein.

One advantage of using a partition blank having a foam interior made of a polyolefin foam is that the two plies of the partition blank may be secured or fused together using only heat, thereby eliminating the need for additional material such as adhesive, staples or other fasteners. The omission of the additional material may reduce the labor and material cost of making the slotted partition. The securement of the two plies together using only heat may not be possible or economically desirable with other materials such as paperboard, commonly used to make partitions.

Such a process of welding opposed plies of a partition together without the use of any additional material other than the material of the partition plies to form a multiple ply partition having the desired stiffness is quick, economical and allows many multiple ply partitions to be mass produced with low material and labor costs. Once the portion of at least one ply is separated from the heat source and allowed to cool, the plies are parent welded together in a permanent relationship.

An alternative method of joining the foam interior layers of the plies of the partition is to adhesively secure them together. Other means of securing the foam interior layers of the folded partition plies may used if desired.

This method of making a two ply partition by securing opposed plies of the partition together is quick, easy and inexpensive. The opposed plies of the partition are permanently secured to each other, making the partition non-disassembling and enhanced by being double layered or double ply without using any additional material or tools.

According to another aspect of the present invention, the partitions described above may be incorporated into a non-disassembling partition assembly having a floor. This non-disassembling partition assembly may be used inside a container or alone with no container. The non-disassembling partition assembly of the present invention comprises at least one first slotted partition intersecting with at least one second slotted partition. The intersecting first and second slotted partitions along with the floor or bottom, form a plurality of holding cells into which different parts or products may be stored for shipment or display.

Each first slotted partition has at least one slot extending inwardly from an edge of the first slotted partition. Likewise each second slotted partition has at least one slot extending inwardly from an edge of the second slotted partition. Each slot of a first slotted partition is engaged with a slot of a second slotted partition at an intersection. Preferably the slots are evenly spaced in order to make the holding cells which are defined by the intersecting partitions of identical dimensions. Each of the slots of the first slotted partitions extends inwardly from an edge of the first slotted partition to approximately the midpoint of the first slotted partition. Each of the slots of the second slotted partitions extends inwardly from an edge of the second slotted partition to approximately the midpoint of the second slotted partition. The first and second slotted partitions are arranged in a matrix.

Preferably, the intersecting first and second slotted partitions are made in a manner described above so each partition has two plies. However, the intersecting partitions may be single ply and/or may be made of other types of materials, such as pure foam having no skin or outer.

The non-disassembling partition matrix is held together in an assembled relation by a plurality of parent weldments which secure the floor to the partition matrix. For purposes of this document, the term "parent weld" or "parent weldment" refers to a weldment of two contacting parts or partitions welded or secured together without the use of any additional material other than the material of the floor or partitions themselves.

In one embodiment, the floor or bottom of such a non-disassembling partition assembly is made of the same material from which the partitions are made before the partitions are doubled over or made two-ply. This material comprises, in one embodiment, a layer of foam and an outer skin secured to the foam layer. In another embodiment, the floor may comprise the material shown in FIG. 3A before it is made double-ply. In other embodiments, the floor may have additional layers or levels of different materials. Regardless of the composition of the floor, the floor is parent welded or attached to one edge of the partition assembly in a manner described below.

One advantage of using a floor having a foam layer made of a polyolefin foam is that the partitions of the present invention may be secured, parent welded or fused to an upper surface of the floor using only heat, thereby eliminating the need for additional material such as adhesive, staples or other fasteners. The omission of the additional material reduces the labor and material cost of making a non-disassembling partition matrix or assembly. The securement of the partitions and floor together using only heat may not be possible or economically desirable with other materials such as paperboard, commonly used to make partitions.

Different embodiments of the non-disassembling partition assembly of the present invention may be manufactured in different ways. The first method comprises intersecting a plurality of first slotted partitions with a plurality of second slotted partitions at a plurality of intersections thus creating a partition matrix. One edge of the partition matrix is placed directly on or proximate a heat source until the edge of the partitions become molten or semi-molten. The heat source is then distanced from the edge of the matrix and a generally rectangular floor having a foam layer placed against the molten or heated edge of the matrix. The latent heat retained by the molten edge of the matrix melts the foam layer of the floor to the material of the partitions. Once allowed to cool the floor is permanently secured to the edge of the partition matrix.

An alternative method of forming a non-disassembling partition assembly having a bottom or floor comprises placing the floor proximate or directly on a heat source and allowing the floor to warm until an upper foam layer of the floor is in a heated or semi-molten state. One edge of the partition matrix is then placed on the upper surface of the heated floor. The heat given off by the floor partially melts the edge of the partitions abutting the floor and/or partially melts a portion of the floor until either the floor or abutting edge of the matrix partitions is in a semi-molten state. The combination is then separated from the heat source. Once allowed to cool, the floor is permanently attached to one edge of the partition matrix and the intersecting partitions fused together so as to make the partition assembly non-disassembling.

The floor acts as a bottom support or base, enabling items placed in the individual holding cells of the assembly to rest upon and be supported by the floor and to be lifted out of the container housing the non-disassembling partition assembly simultaneously with the removal of the non-disassembling partition assembly.

This method of securing a floor to a partition assembly is quick, easy and inexpensive. The intersecting first and second slotted partitions are permanently secured to each other along one edge, making the assembly non-disassembling and also enhanced by a bottom or floor permanently attached to one edge of the partition assembly without using any additional material or tools.

BRIEF DESCRIPTION OF THE DRAWINGS

FIG. 4A is a diagrammatic side elevational view illustrating a method of manufacturing partition blanks according to one embodiment of the present invention;

FIG. 4B is a diagrammatic side elevational view illustrating a method of manufacturing a roll of material used to make partition blanks according to another embodiment of the present invention;

FIG. 5C1 is a perspective view illustrating the interior foam layers of opposed plies of the partition blank of FIG. 5A being joined without heat;

DETAILED DESCRIPTION OF THE PREFERRED EMBODIMENTS

Figure 1:
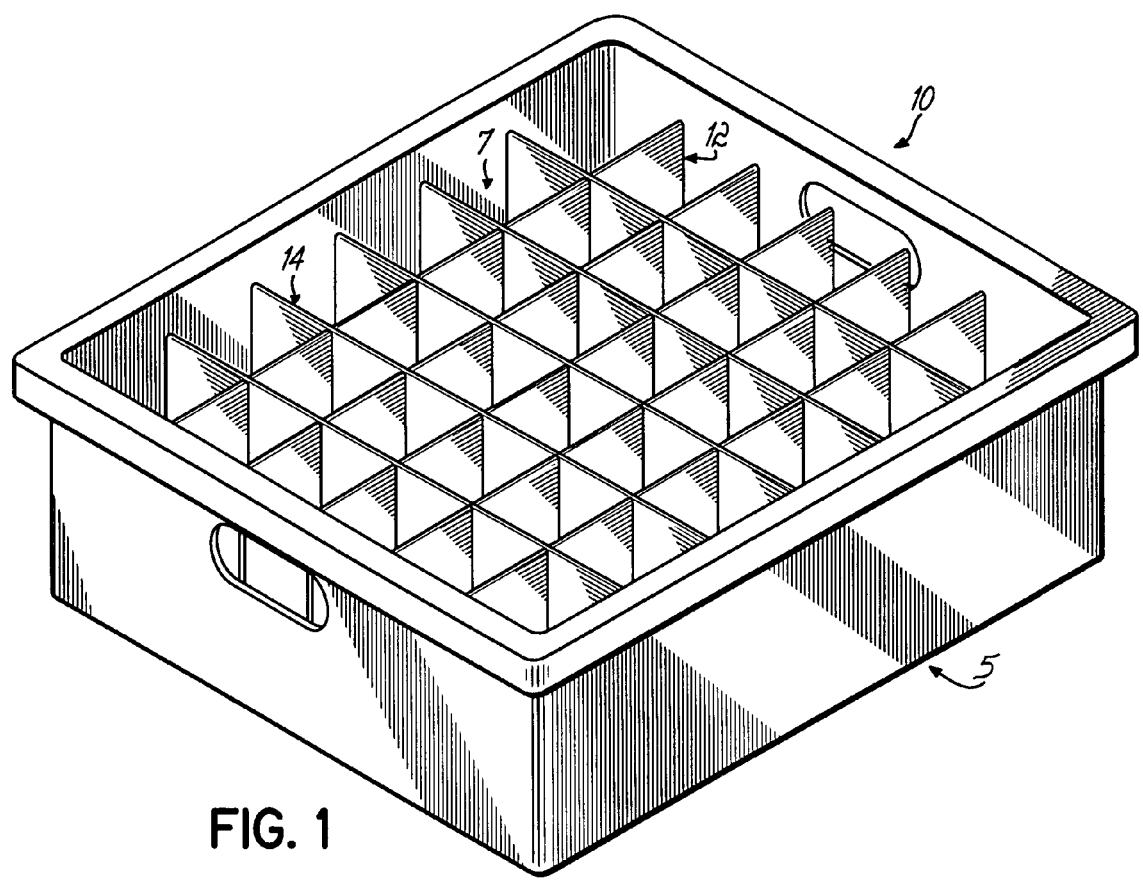
FIG. 1 is a perspective view of the partition assembly of the present invention located inside a container.
Figure 2:
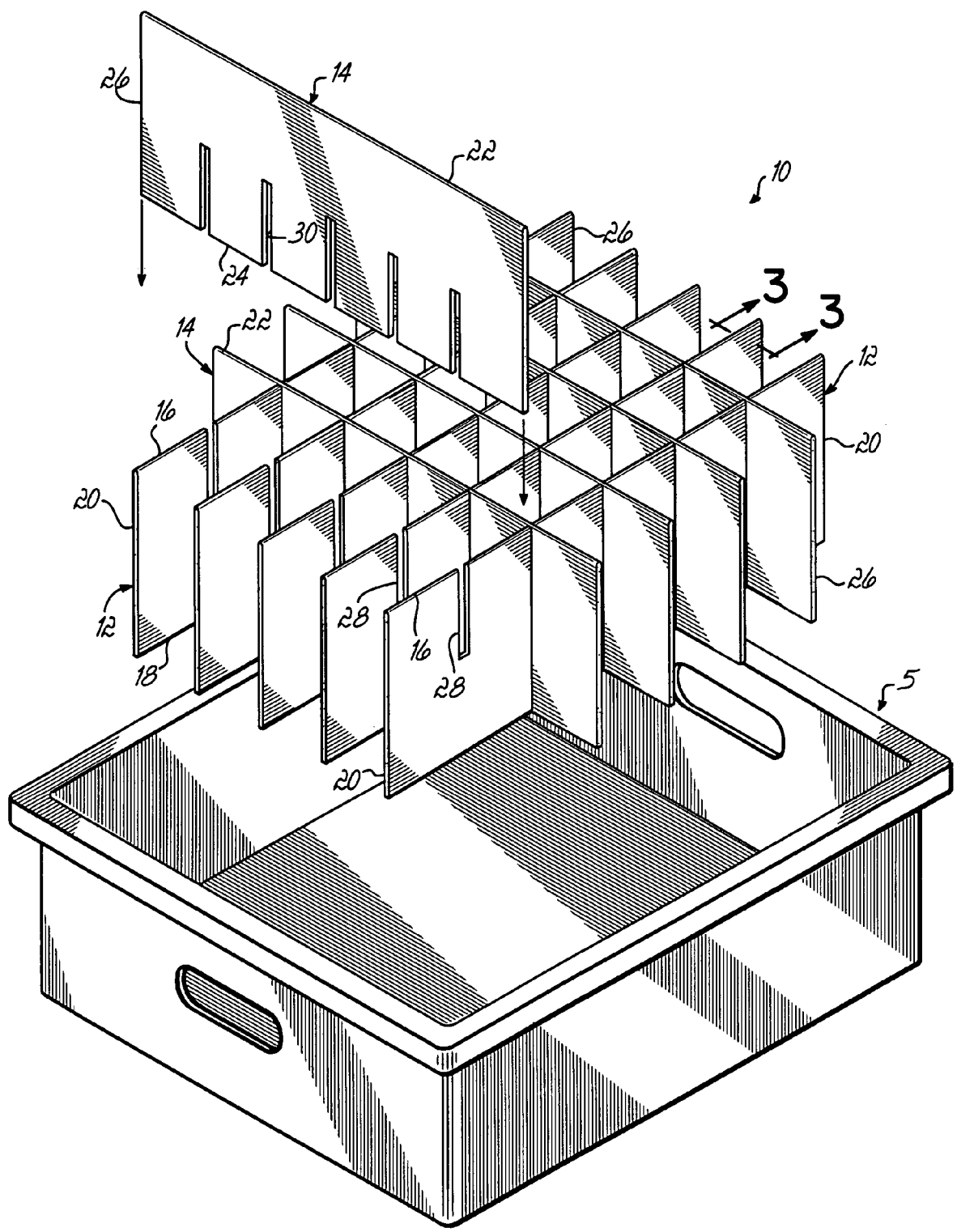
FIG. 2 is a perspective view of the construction of the partition assembly of FIG. 1 illustrating a plurality of first slotted partitions and a plurality of second slotted partitions.

Referring to the drawings and particularly to FIG. 1, there is illustrated a partition assembly 10 for dividing the space inside a container 5. Although one type or configuration of container 5 is illustrated in FIG. 1, the partition assembly 10 of the present invention may be used in any type of container or box. As illustrated in FIG. 2, the partition assembly 10 comprises a plurality of parallel first slotted partitions 12 intersecting with a plurality of parallel second slotted partitions 14.

As shown in FIG. 2, each first slotted partition 12 has a rounded upper or top edge 16, a planar bottom edge 18 and two opposed side edges 20. Likewise each second slotted partition 14 has a rounded upper or top edge 22, a planar bottom edge 24 and two opposed side edges 26.

Each first slotted partition 12 has at least one slot 28 which extends downwardly from the top edge 16 of the first slotted partition 12 to approximately the midpoint of the first slotted partition 12. The slots 28 may be evenly spaced apart in order that the individual holding cells 7 of the partition assembly may be evenly sized. See FIG. 1. Alternatively, the slots 28 of the first slotted partitions 12 may be unevenly spaced in order to form holding cells of the partition assembly of differing sizes to accept different sized parts. The slots 28 are shown as being vertical but may be horizontal if the partition assembly 10 is placed on edge.

As shown in FIG. 2, each second slotted partition 14 has at least one slot 30 extending upwardly from the bottom edge 24 of the second slotted partition 14 to approximately the midpoint of the second slotted partition 14. The slots 30 of the second slotted partitions 14 may also be evenly spaced in order so that the holding cells 7 of the partition assembly 10 may be evenly sized. Again see FIG. 1. Alternatively, the slots 30 may be unevenly spaced in order to form holding cells of the partition assembly of differing sizes adapted to accept different sized parts. The slots 30 are shown as being vertical but may be horizontal if the partition assembly 10 is placed on edge.

Figure 3:
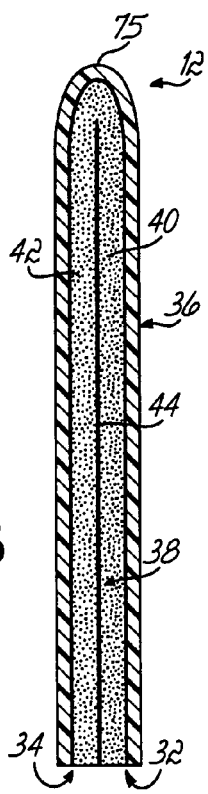
FIG. 3 is a cross-sectional view taken along the line 3-3 of FIG. 2.

In one embodiment of the present invention each of the first and second slotted partitions 12, 14 is made of a multilayered material. Each of the partitions 12, 14 is a two-ply partition formed by the method shown in FIGS. 5A-5F and described below. FIG. 3 illustrates one of the partitions 12 in detail according to one embodiment of the present invention. As best illustrated in FIG. 3, slotted partition 12 has two opposed plies 32 and 34 which are parallel to one another and joined together. The partition 12 has an outer layer or skin 36 assuming a generally inverted U-shaped configuration when the partition 12 is folded and the opposed plies 32 and 34 secured together. A wide variety of materials may be used for the outer layer or skin 36 including, but not limited to, woven polyesters, non-woven polypropylenes, foamed and solid polyolefins, latex, non-polyolefin plastics.

In the embodiment shown in FIG. 3, inside the outer layer or skin 36 is a foam interior 38 comprising two layers 40, 42 joined together along an interior surface 44. A wide variety of materials may be used for the foam interior 38 of the partition 12. In one preferred embodiment, the foam interior 38 is a polyolefin foam. However, other materials other than foam which may be welded or joined together may be used in accordance with the present invention. If desired, the outer skin 36 may be omitted, in which case, the entire partition 12 would be made of foam.

Figure 3A:
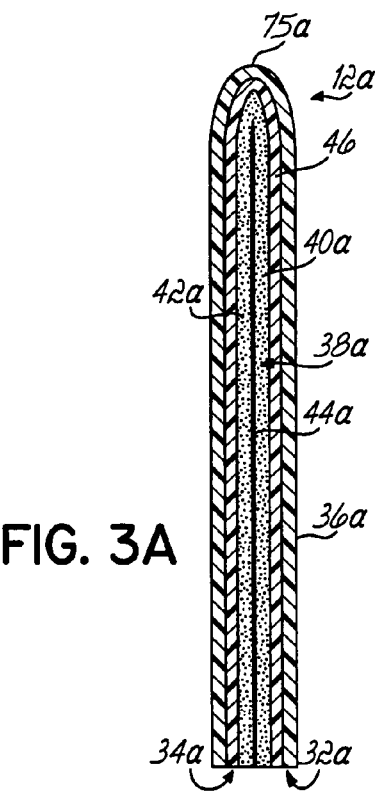
FIG. 3A is a cross-sectional view of an alternative embodiment of a partition used in accordance with the present invention having a middle layer.

FIG. 3A illustrates an alternative embodiment of the present invention. In this embodiment, partition 12a has an additional layer incorporated therein when compared to the partition 12 shown in FIG. 3. In this alternative embodiment, the partition 12a has an outer layer or skin 36a, a foam interior 38a comprising two layers 40a, 42a joined together along surface 44a. In addition, a middle stiffening layer 46 is secured between the outer layer or skin 36a and the foam interior 38a. Like the outer layer 36a of the partition 12a, the middle stiffening layer 46 assumes a generally inverted U-shaped configuration when the partition 12a is folded and the opposed plies 32a and 34a secured together as shown in FIG. 3A. A wide variety of materials may be used for the middle stiffening layer or skin 46 including, but not limited to, various plastics. If desired, additional middle stiffening layers of any suitable material (not shown) may be added to the partition blank. The partition 12a has a smooth upper edge 75a like the partition 12 shown in FIG. 3 created by the folding of a partition blank and securing the opposed plies 32a, 34a together in the manner described below.

Referring to FIG. 4A, to practice the method of this invention and form a multilayered partition blank 66 for subsequent use in forming a slotted two ply partition like partition 12 shown in FIG. 3 for use in a partition assembly, a roll 48 of outer skin material is provided. As illustrated in FIG. 4A, a web of outer skin material 50 is unwound from the roll 48 and passed between two heated conveyors 52. Other heat sources may used if desired. Another roll 54, this one containing a web 56 of foam material is provided. The continuous web 56 of foam is unrolled from the roll 54 and passed into a nip 58 between rollers 60. The webs 50, 56 are joined together to create a multilayered web 62. As shown in FIG. 4A, the multilayered web 62 is passed between cooling conveyors 63 and then cut with cutting device 64 to create a partition blank 66. Any suitable means for cooling the multilayered web 62 other than conveyors may be used if desired. The cut multilayered partition blanks 66 are then stacked on top of one another to create a stack 68.

Figure 4C:
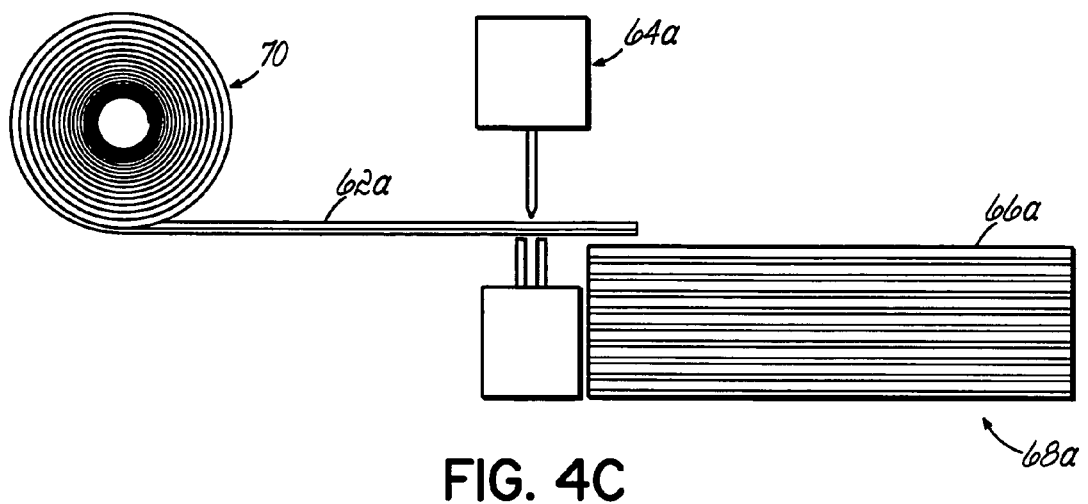
FIG. 4C is a diagrammatic side elevational view further illustrating the method of manufacturing partition blanks according to the method of FIG. 4B.

FIGS. 4B and 4C illustrate another method of forming a cut multilayered partition blank 66a. In this method, a roll 48a of outer skin material is provided. As illustrated in FIG. 4B, a web of outer skin material 50a is unwound from the roll 48a and passed between two heated conveyors 52a. Again, other heat sources other than conveyors may used if desired. Another roll 54a, this one containing a web 56a of foam material is provided. The continuous web 56a of foam is unrolled from the roll 54a and passed into a nip 58a between rollers 60a. The webs 50a, 56a are joined together to create a multilayered web 62a. As shown in FIG. 4B, the multilayered web 62a is then passed between cooling conveyors 63a before being rolled up into a roll 70. As illustrated in FIG. 4C, the multilayered web 62a is unrolled from roll 70 and cut with cutting device 64a at one or more desired locations to create a partition blank 66a. The partition blanks 66a are then stacked to create a stack 68a.

Although FIGS. 4A-4C illustrate several method of manufacturing a multilayered partition blank, any other suitable known method of making a multilayered partition blank may be used such as co-extrusion, heat bonding or laminating several layers together.

Figure 5A:
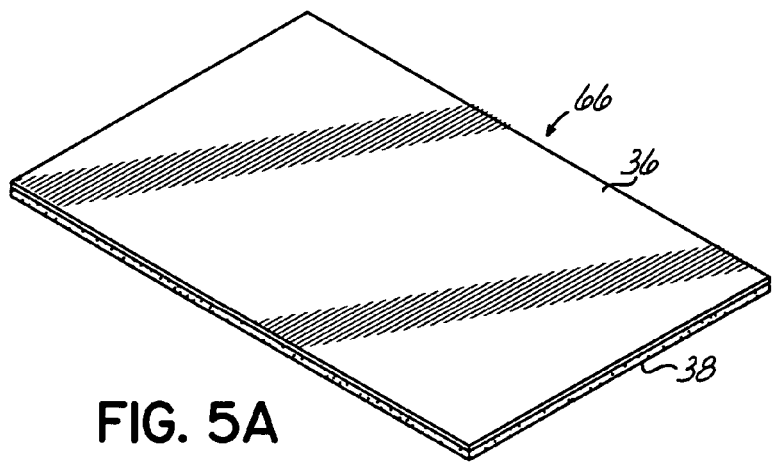
FIG. 5A is a perspective view of a partition blank.
Figure 5B:
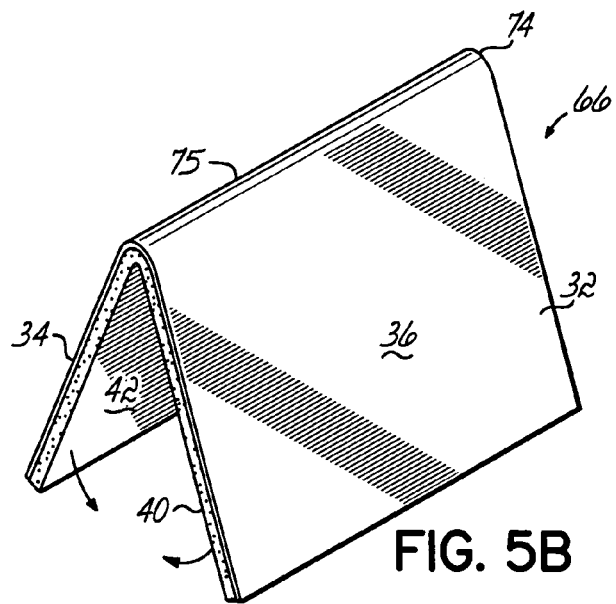
FIG. 5B is a perspective view illustrating the partition blank of FIG. 5A being folded.

Once a multilayered partition blank 66, 66a has been created, the multilayered partition blank is then formed into a two-ply slotted partition 12 using the method illustrated in FIGS. 5A-5F. For purposes of simplicity, FIGS. 5A-5F illustrate a method of creating a two ply partition 12. However, the same method may be used to create any partition used in accordance with the present invention. FIG. 5A illustrates a multilayered partition blank 66 in a planar flat orientation. FIG. 5B illustrates the multilayered partition blank 66 of FIG. 5A being folded along a fold line 74 so as to create two opposed plies 32, 34 and a rounded smooth edge 75 joining the plies as seen in FIG. 3. This smooth edge 75 becomes the upper edge of the partition 12.

Figure 5C:
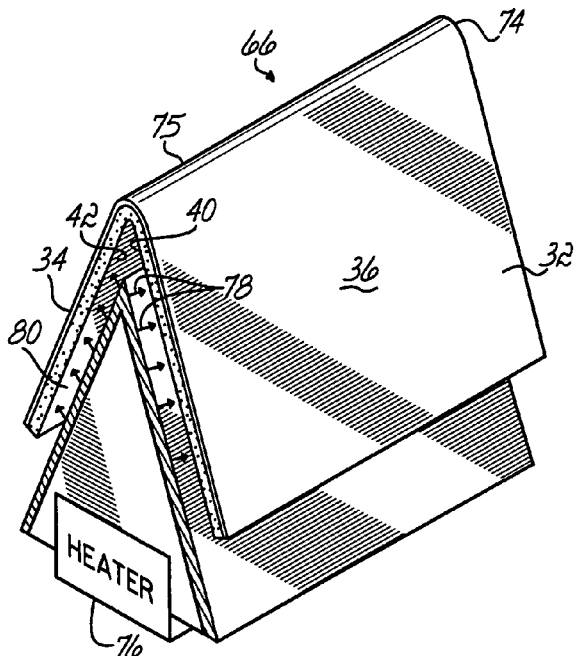
FIG. 5C is a perspective view illustrating the interior foam layers of opposed plies of the partition blank of FIG. 5A being heated.

FIG. 5C illustrates the interior foam layers 40, 42 of the opposed plies 32, 34, respectively being heated with a heat source 76. In the illustrated embodiment, the heat source 76 blows hot air in the direction of arrows 78 to heat at least one of the interior foam layers 40, 42 of the folded multilayered partition blank 66. Of course, other types of heaters may be used in accordance with the present invention to heat at least one of the interior foam layers 40, 42 of the folded multilayered partition blank 66 using any number of known methods.

Figure 5D:
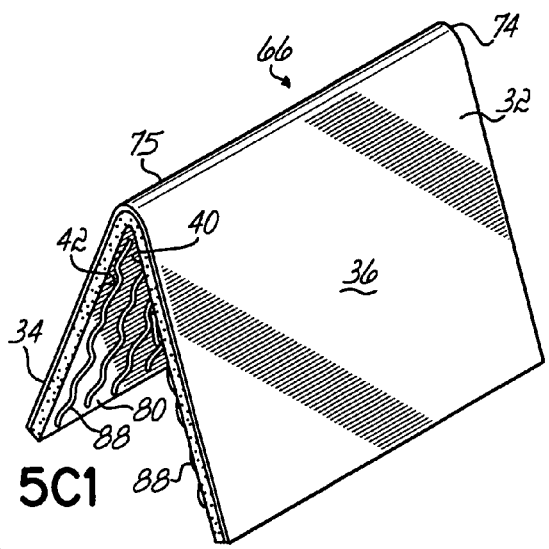
FIG. 5D is a perspective view illustrating the heated partition blank of FIG. 5C cooling under pressure according to one embodiment of the present invention.
Figure 5D:
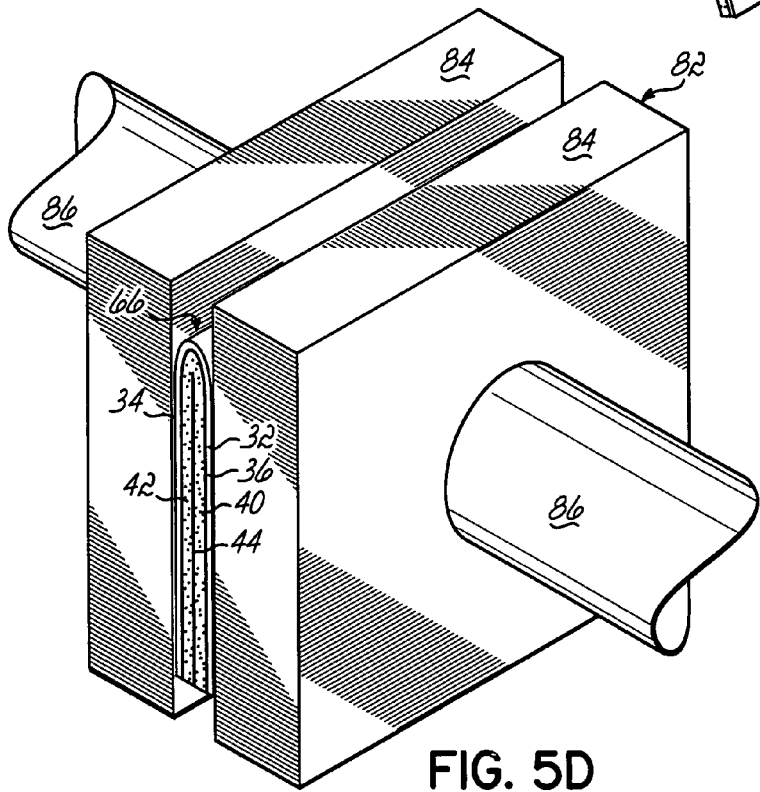

FIG. 5D illustrates the interior surfaces 80 of the foam layers 40, 42 of the opposed plies 32, 34, respectively, contacting each other and being under pressure from a pressure source 82 such as a press like the one illustrated in FIG. 5D. In the illustrated press 82 opposed plates 84 contact the outer skin 36 of the folded multilayered partition blank 66. Rods 86 extending outwardly from the plates 84 and joined thereto cause the plates to move to and away from each other in a known manner. As shown in FIG. 5D, the plates 84 push the opposed plies 32, 34 of the folded multilayered partition blank 66 together until the inner surfaces 80 thereof contact each other. Pressure is then applied by the press 82 as the opposed plies 32, 34 of the folded multilayered partition blank 66 are cooled. The result is that the foam interior layers 40, 42 of the opposed plies 32, 34 of the multilayered partition blank 66 are fused together to create partition 12. Although one type of press is illustrated any other type of device may be used to place the two opposed plies of the blank under pressure during the cooling process. Any method of cooling the opposed plies 32, 34 of the folded multilayered partition blank 66 may be used in accordance with the present invention to fuse the interior foam layers 40, 42 together including allowing the heated foam interior layer or layers to cool at room temperature.

Figure 5E:
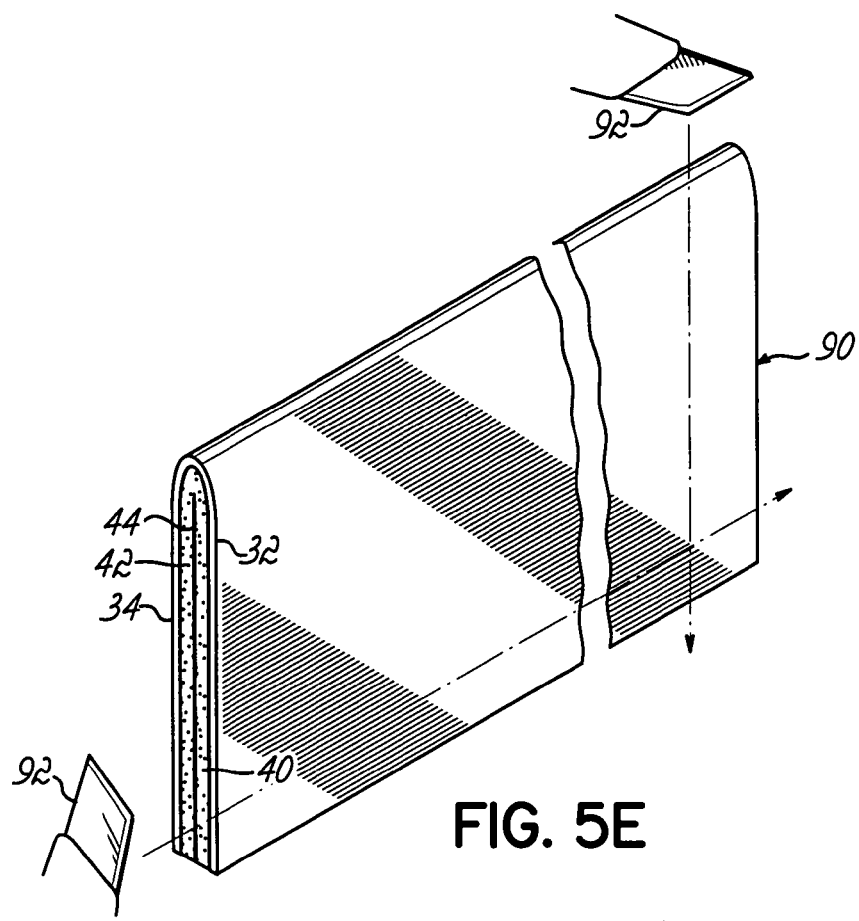
FIG. 5E is a perspective view illustrating a method of cutting a two-ply partition to size.
Figure 5F:
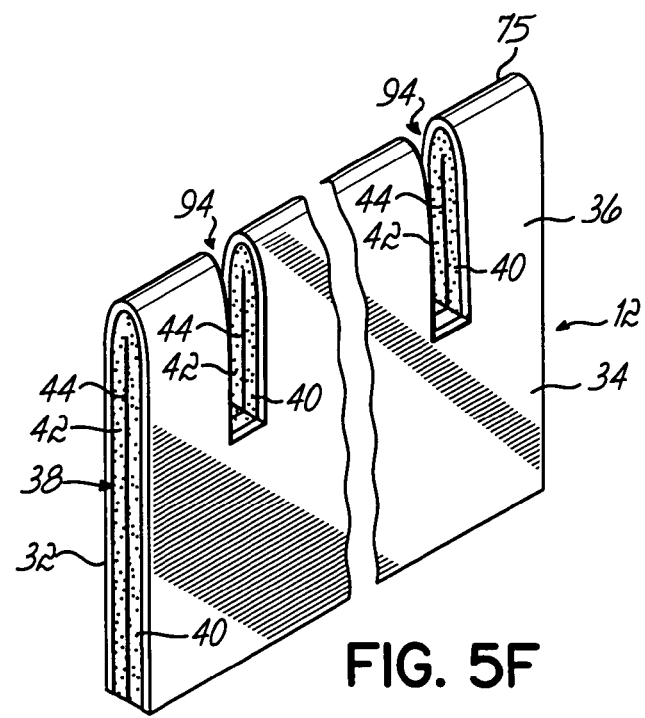
FIG. 5F is a perspective view illustrating a finished slotted partition according to one embodiment of the present invention.

As shown in FIG. 5C1, the heater may be omitted from the process of manufacturing a slotted partition 12 shown in FIG. 5F. In such a situation, adhesive 88 may be applied to the inner surfaces 80 of the opposed plies 32, 34 of the folded multilayered partition blank 66 either before or after the multilayered partition blank 66 is partially folded as shown in FIG. 5B. Other known methods of securing the opposed plies 32, 34 of the folded multilayered partition blank 66 may be used if desired.

FIG. 5E illustrates an unspotted two ply partition 90 resulting from the securing of the opposed plies 32, 34 of the folded multilayered partition blank 66 together in any manner including those described above. One or move knives 92 may be used to cut the unspotted two ply partition 90 to the desired size.

As shown in FIG. 5F, slots 94 are then cut out of the unslotted two ply partition 90 at the desired locations. The end result is a two ply slotted partition 12 for use in a partition assembly such as the one 10 shown in FIGS. 1 and 2.

Figure 6:
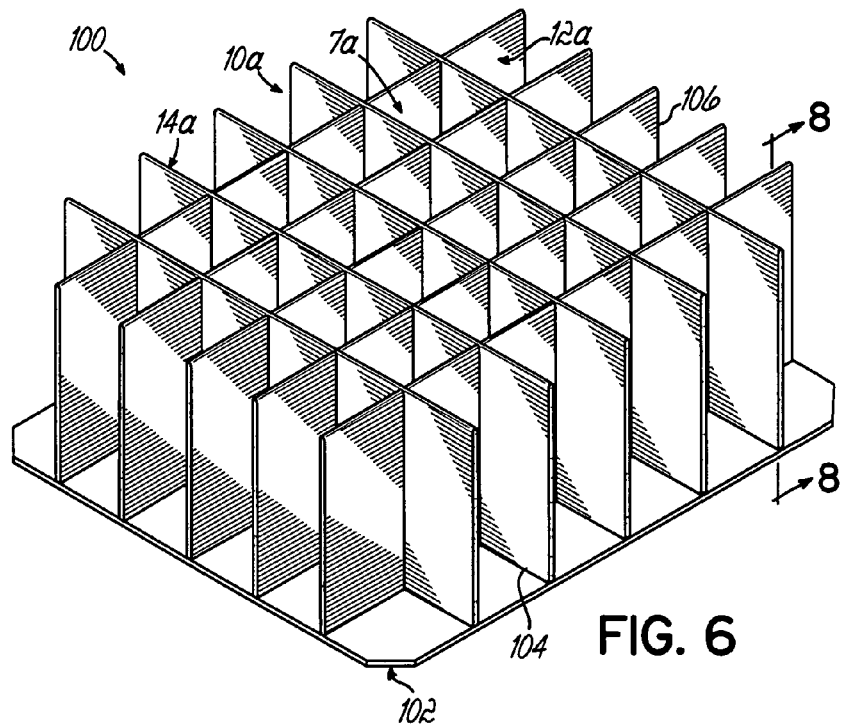
FIG. 6 is a perspective view of one embodiment of a non-disassembling partition assembly according to one aspect of the present invention.
Figure 7:
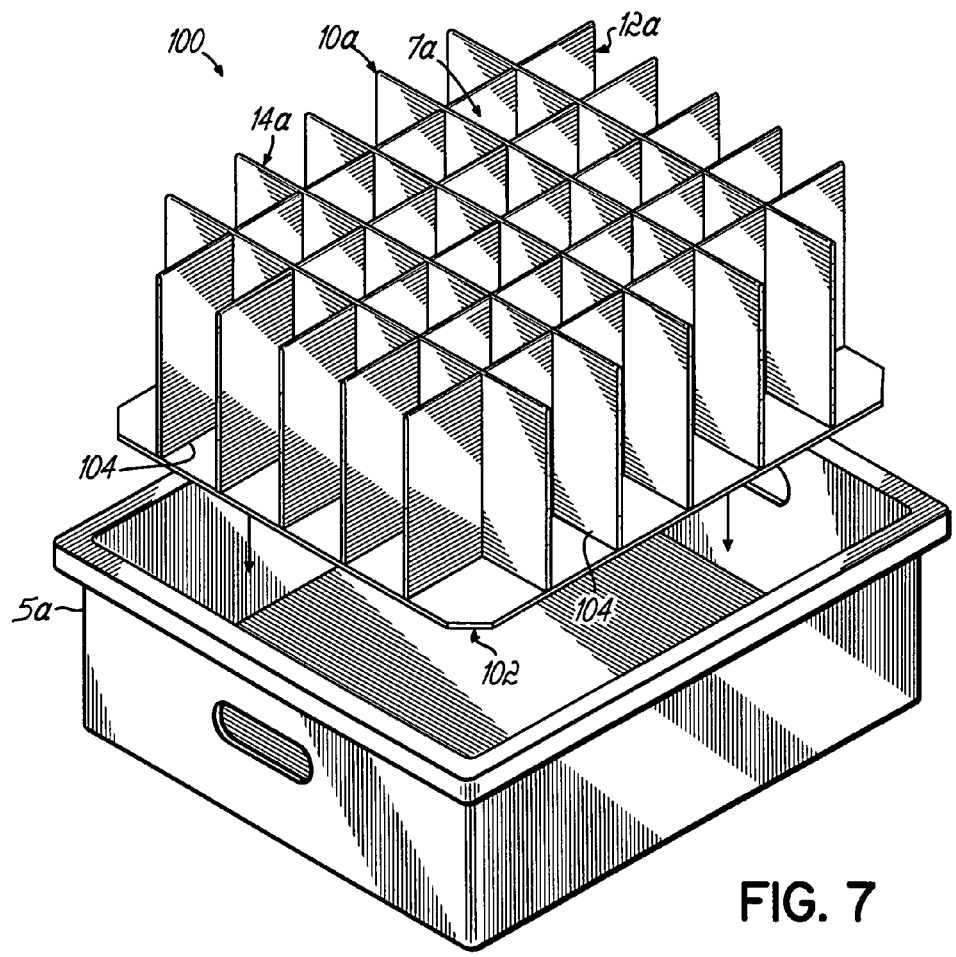
FIG. 7 is a perspective view of the non-disassembling partition assembly of FIG. 6 being placed inside a container.
Figure 8:
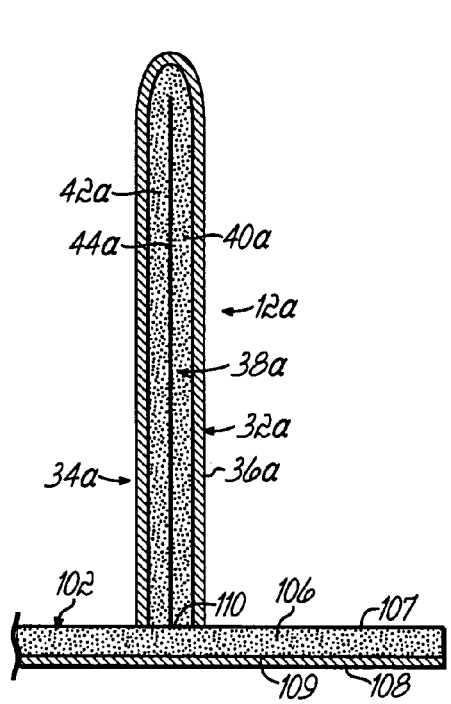
FIG. 8 is a view taken along the line 8-8 of FIG. 6.

FIGS. 6-8 illustrate one embodiment of non-disassembling partition assembly 100 having a solid floor or bottom 102 secured to a bottom or lower edge 104 of a partition assembly 10a, like the partition assembly 10 described above.

Non-disassembling partition assembly 100 may be used inside or outside of a container. FIG. 6 illustrates the non-disassembling partition assembly 100 outside a container. FIG. 7 illustrates non-disassembling partition assembly 100 inside a container 5a. Although one type or configuration of container 5a is illustrated in FIG. 7, the non-disassembling partition assembly 100 may be used in any type or configuration of container or box.

The non-disassembling partition assembly 100 comprises intersecting first and second slotted partitions 12a, 14a, along with a floor or bottom 102, which create or define a plurality of individual holding cells 7a for storing or shipping products. When the non-disassembling partition assembly 100 is used inside a container additional holding cells are created due to the container sidewalls.

The generally rectangular floor 102 is preferably made of the same material as the slotted partitions 12, 14 of the partition assembly or matrix 10 shown in FIG. 1 and described above. In one embodiment, shown in detail in FIG. 8, the floor 102 comprises an upper foam layer 106 and an outer skin 108 secured to the lower surface 109 of the foam layer 106. The outer skin 108 is preferably a woven polyester but may be any other material such as non-woven polypropylenes, foamed and solid polyolefins, latex, non-polyolefin plastics. Similarly, a wide variety of materials may be used for the foam layer 106 of the floor 102. Preferably, the foam layer 106 is a polyolefin foam. However, other similar materials including other types of foams may be used in accordance with the present invention in the upper layer 106. Although the floor 102 is illustrated as being generally rectangular, it may be circular, oval or any other desired shape. Also, the floor 102 may have any number of layers or levels made of different materials.

As best illustrated in FIG. 8, slotted partition 12a has two opposed plies 32a and 34a which are parallel to one another and joined together. The partition 12a has an outer layer or skin 36a assuming a generally inverted U-shaped configuration when the partition 12a is folded and the opposed plies 32a and 34a secured together. A wide variety of materials may be used for the outer layer or skin 36a including, but not limited to, woven polyesters, non-woven polypropylenes, foamed and solid polyolefins, latex, non-polyolefin plastics. Inside the outer layer or skin 36a is a foam interior 38a comprising two layers 40a, 42a joined together along an interior surface 44a. A wide variety of materials may be used for the foam interior 38a of the partition 12a. In one preferred embodiment, the foam interior 38a is a polyolefin foam. However, other materials other than foam which may be welded or joined together may be used in accordance with the present invention. Partition 14a is similarly composed.

In accordance with the present invention, the partition 12a is parent welded or secured to the upper surface 107 of the floor 102 at location 110. More particularly, the foam interior 38a of the partition 12a is parent welded without the use of any other material to the foam layer 106 of the floor 102 using one of the methods described herein or any other suitable method.

Figure 10:
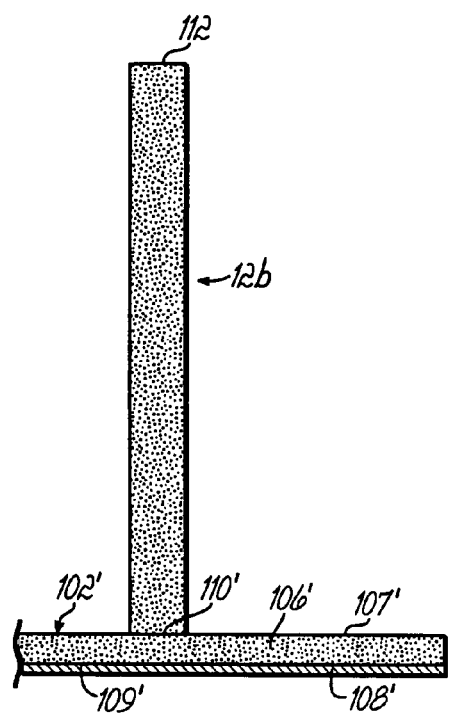
FIG. 10 is a view taken along the line 10-10 of FIG. 9.
Figure 9:
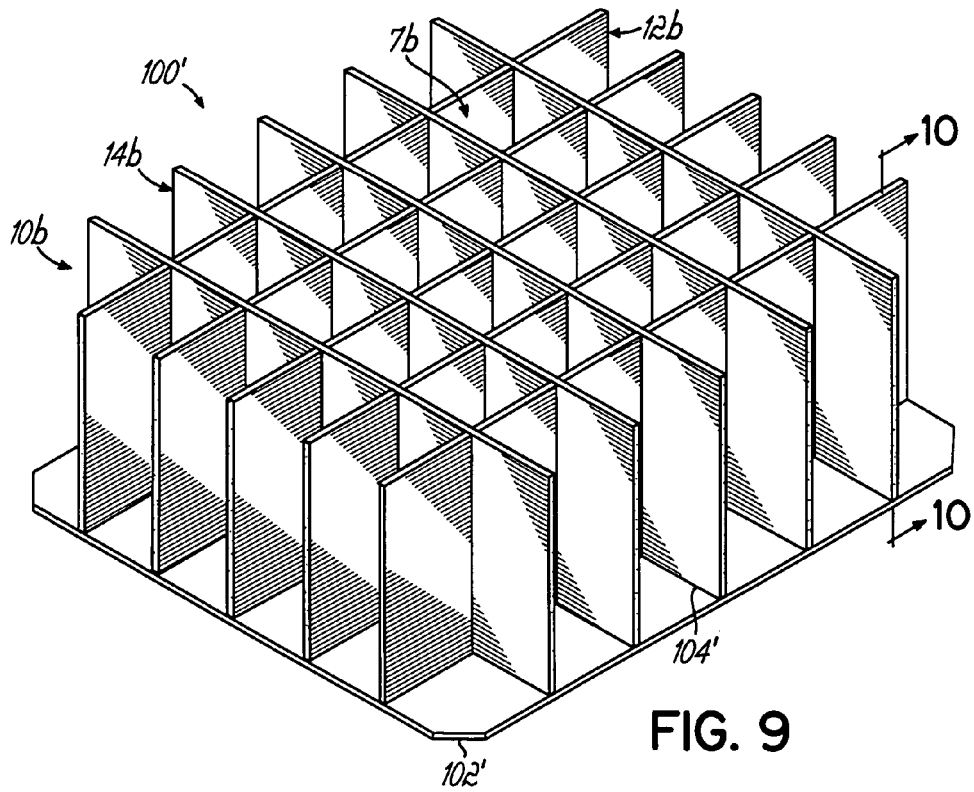
FIG. 9 is a perspective view of an alternative embodiment of non-disassembling partition assembly.

FIGS. 9-10 illustrate another embodiment of non-disassembling partition assembly 100' having a floor 102' secured to a bottom or lower edge 104' of a partition assembly 10b. The partition assembly 10b of this embodiment comprises intersecting first and second slotted partitions 12b, 14b. The intersecting first and second slotted partitions 12b, 14b, along with the floor or bottom 102', create a plurality of individual holding cells 7b for storing or shipping products. FIG. 9 illustrates the non-disassembling partition assembly 100' used without a container. However, the non-disassembling partition assembly 100' may be used inside a container if desired.

The floor 102' of the non-disassembling partition assembly 100' is identical to the floor 102 of the embodiment shown in FIGS. 6-8 and described above. In this embodiment, however, the slotted partitions 12b, 14b are different than the slotted partitions 12a, 14a shown in FIGS. 6-8 and described above. See FIG. 10. In this embodiment, the floor 102' comprises an upper foam layer 106' having an upper surface 107' and an outer skin 108' secured to other or lower surface 109' of the foam layer 106'. Also, the floor 102' may have any number of layers or levels made of different materials.

As best illustrated in FIG. 10, slotted partition 12b is made solely of foam and preferably a polyolefin foam. Although the slotted partition 12b is shown having a flat upper surface 112, it may have a rounded upper surface or assume other configurations. A wide variety of materials may be used for the partitions 12b, 14b as long as they may be parent welded to the floor 102'. For example, the partition 12b shown in FIG. 10 may be covered with a woven polyester material or other similar material.

In accordance with the present invention, the partition 12b is parent welded or secured to the upper surface 107' of the floor 102' at location 110'. More particularly, the foam of the partition 12b is parent welded without the use of any other material to the foam layer 106' of the floor 102' using one of the methods described herein or any other suitable method.

FIGS. 11A-11D illustrate one method by which either embodiment of non-disassembling partition assembly 100, 100' or any other like embodiment may be manufactured. For simplicity, this method will be described with respect to the embodiment of non-disassembling partition assembly 100 shown in FIGS. 6-8.

Figure 11A:
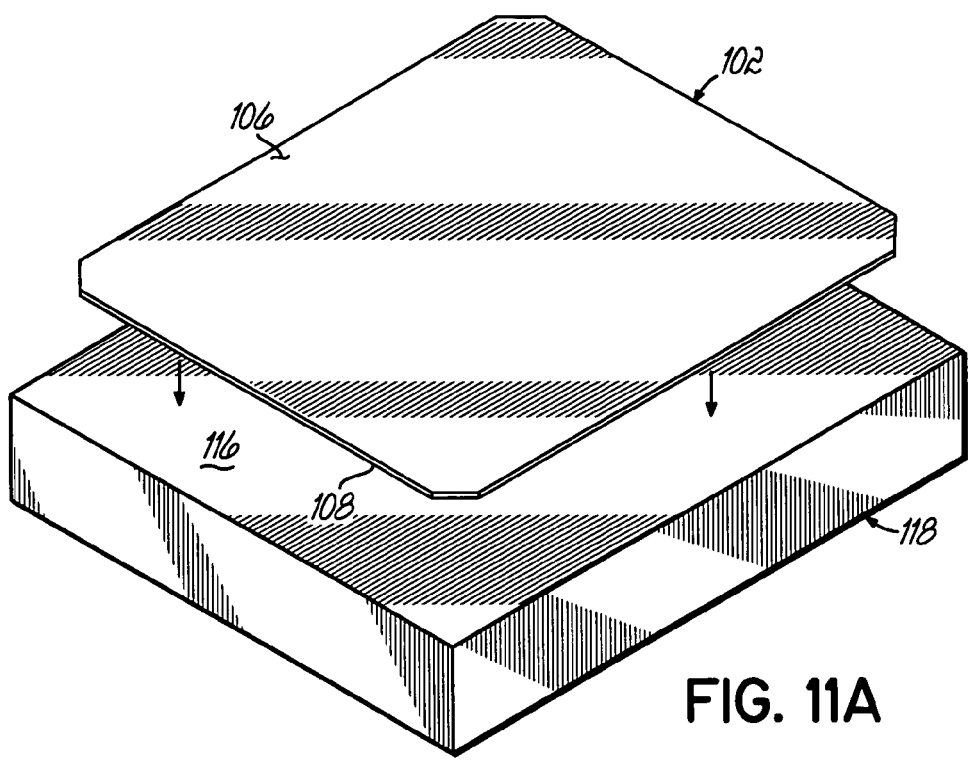
FIG. 11A is a perspective view of a floor of a non-disassembling partition assembly being placed on a hot plate.

As shown in FIG. 11A, a generally rectangular piece of material which becomes the floor 102 of the non-disassembling partition assembly 100 is placed on a heated upper surface 116 of a hot plate 118 so that the outer skin 108 of the floor 102 abuts or contacts the heated surface 116 of the hot plate 118. The melting temperature of the outer skin 108 of the floor 102 is substantially higher than the melting temperature of the upper foam layer 106 of the floor 102. Consequently, heat from the hot plate 118 penetrates the outer skin 108 of the material 102 without physically altering it in any way, i.e. burning it and partially melts or softens the upper foam layer 106 of the piece of material or floor 102 to a molten or partially molten state.

Figure 11C:
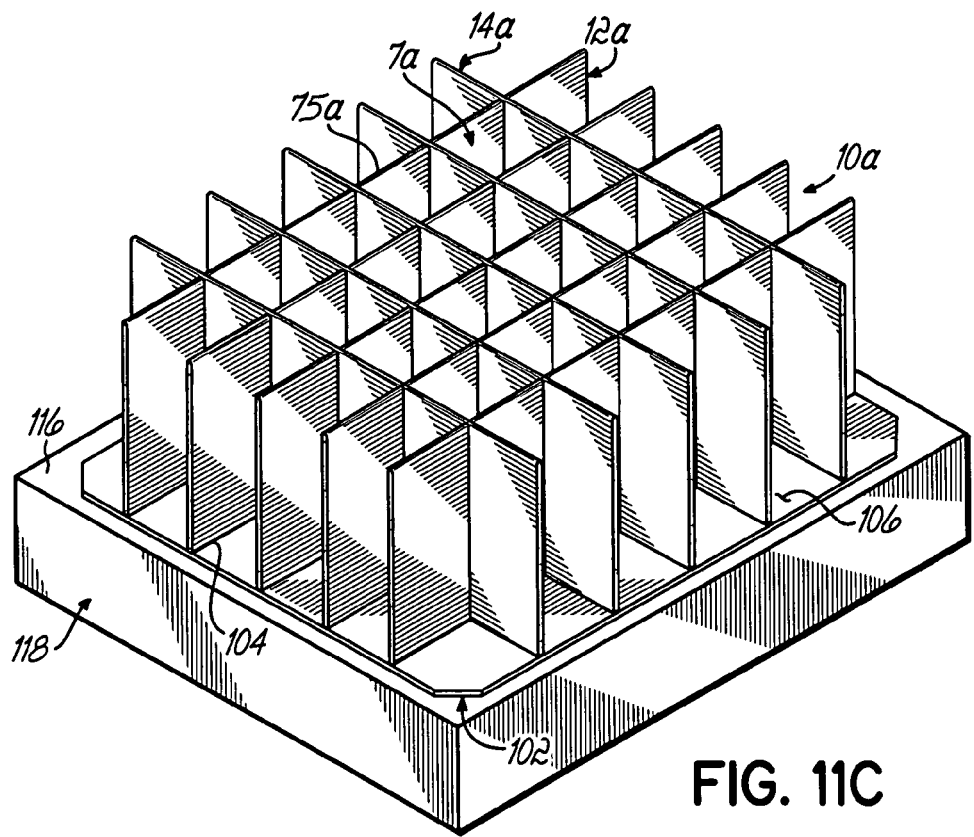
FIG. 11C is a perspective view of the non-disassembling partition assembly on the hot plate of FIG. 11A.
Figure 11B:
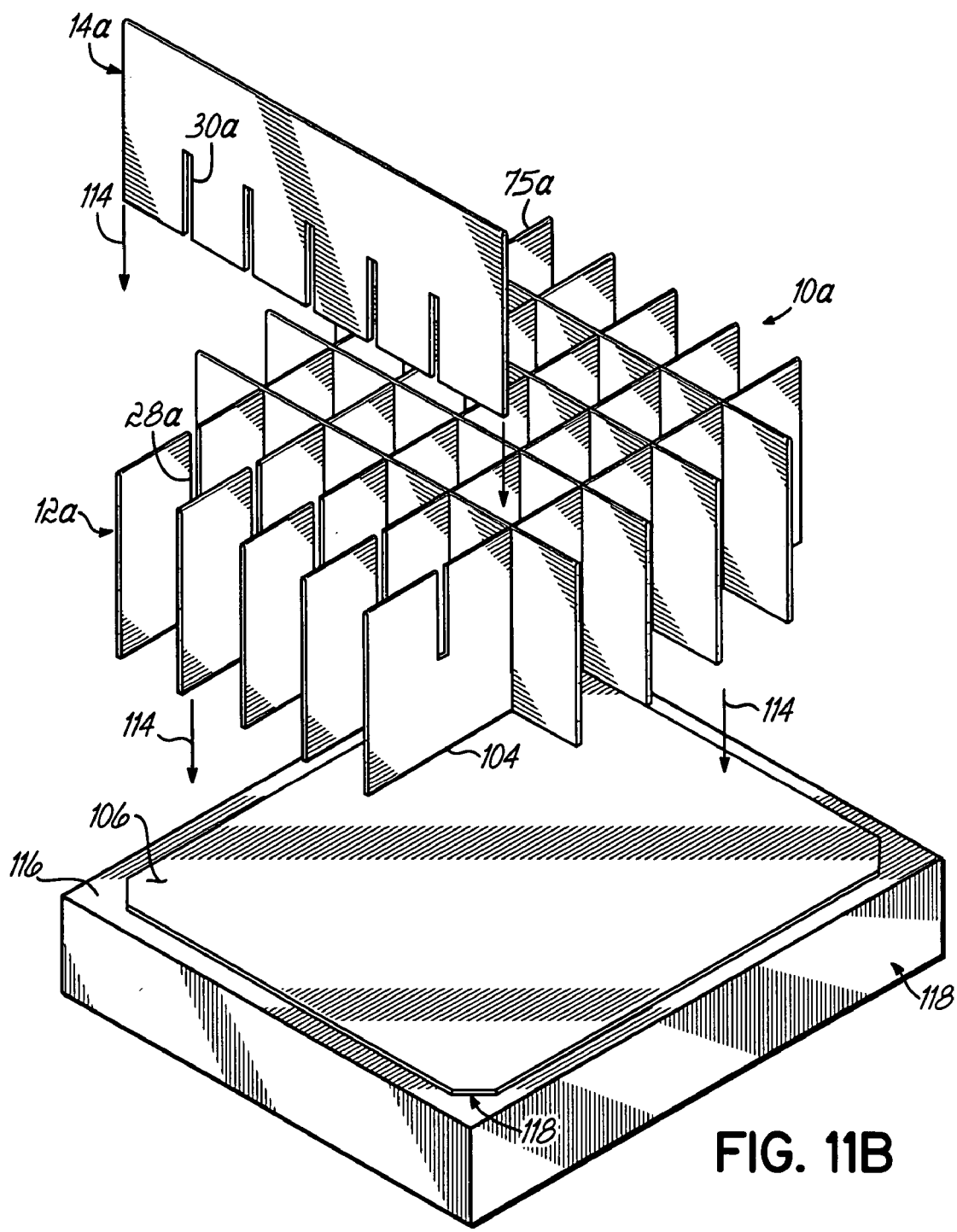
FIG. 11B is a perspective view of a partition assembly being assembled and lowered into engagement with the heated floor of FIG. 11A.

As shown in FIG. 11B, a plurality of first slotted partitions 12a are lined up in a spaced parallel manner with their slots 28a extending downwardly from the top edge 75a thereof. A plurality of second slotted partitions 14a are moved downwardly as shown by the arrows 114 in FIG. 11B until the upwardly directed slots 30a of the second slotted partitions 14a engage the slots 28a of the first slotted partitions 12a at a plurality of intersections. The partitions 12a, 14a thus form a partition matrix or assembly 10a which at this point may still be disassembled.

As shown in FIG. 11B, the partition matrix 10a is then lowered in the direction of arrows 114 downwardly onto the heated upper layer 106 of the floor 102 so that a lower edge 104 of the matrix 10a abuts the upper foam layer 106 of the floor 102. Heat from the hot plate 118 heats the upper layer 106 of the floor 102 to a molten or semi-molten state. As shown in FIG. 11C, the partition assembly 10a and floor 102 rest on the heated upper surface 116 of the hot plate 118 for a predetermined period of time.

Figure 11D:
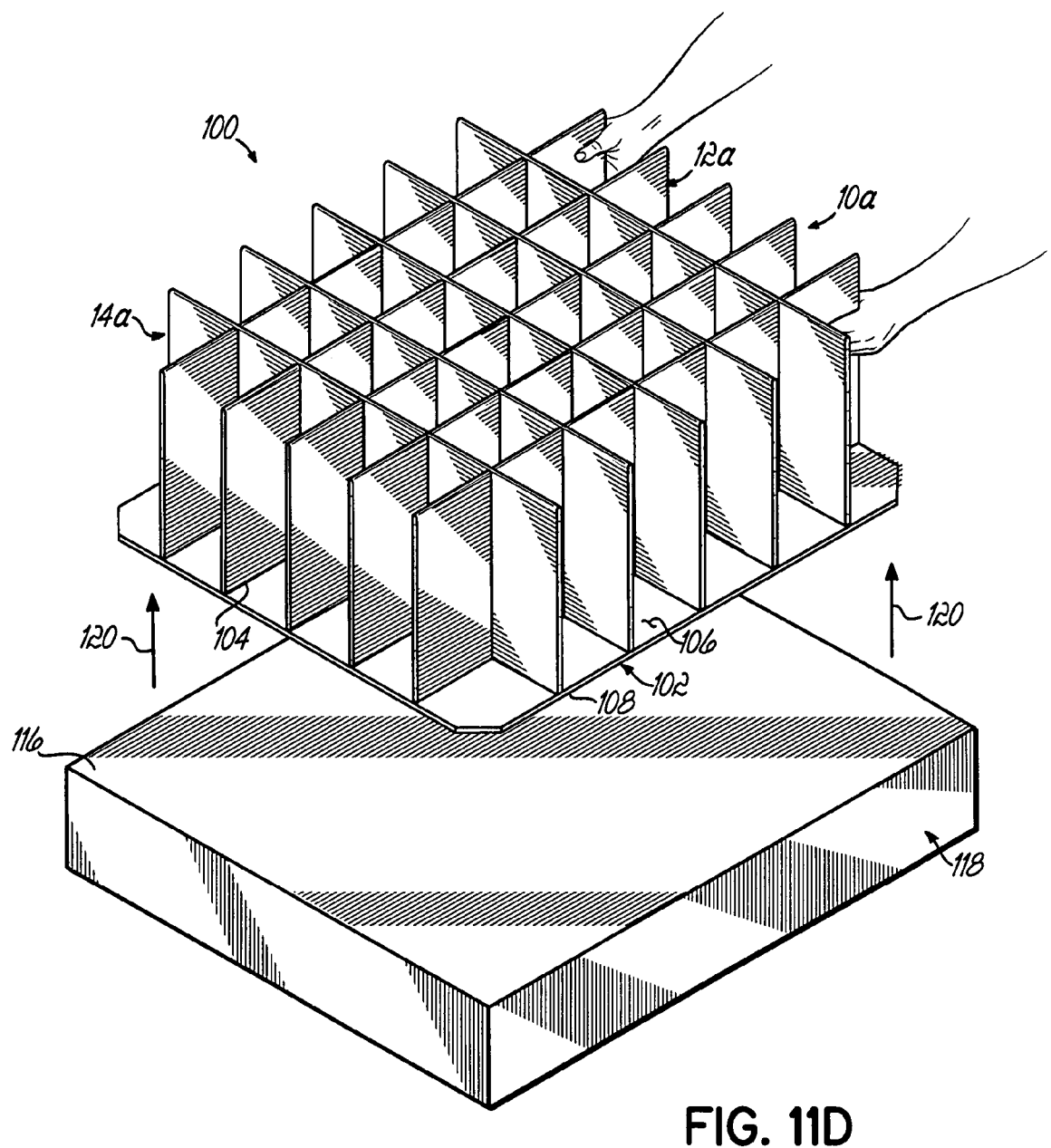
FIG. 11D is a perspective view of the non-disassembling partition assembly of FIG. 11C being removed from the hot plate.

As shown in FIG. 11D, the non-disassembling matrix 100 as a whole is then removed from the hot plate 118. See arrows 120. Retained heat from the upper layer 106 of the floor 102 partially melts the foam interior portions 38a of the partitions 12a, 14a. The floor 102 and partition matrix 10a are then allowed to cool, thereby permanently securing the first and second intersecting partitions 12a, 14a and permanently securing the floor 102 to the edge 104 of the partition matrix 10a. The floor 102 is thereby permanently attached to the bottom edge 104 of the partition assembly 10a and forms a bottom or base for the complete assembly. This configuration of partition assembly with a bottom or floor enables individual articles placed inside the holding cells of the non-disassembling partition assembly 100 to be lifted out of a box or container with the non-disassembling partition assembly 100 when the non-disassembling partition assembly 10 is lifted out of a box or container.

Figure 12A:
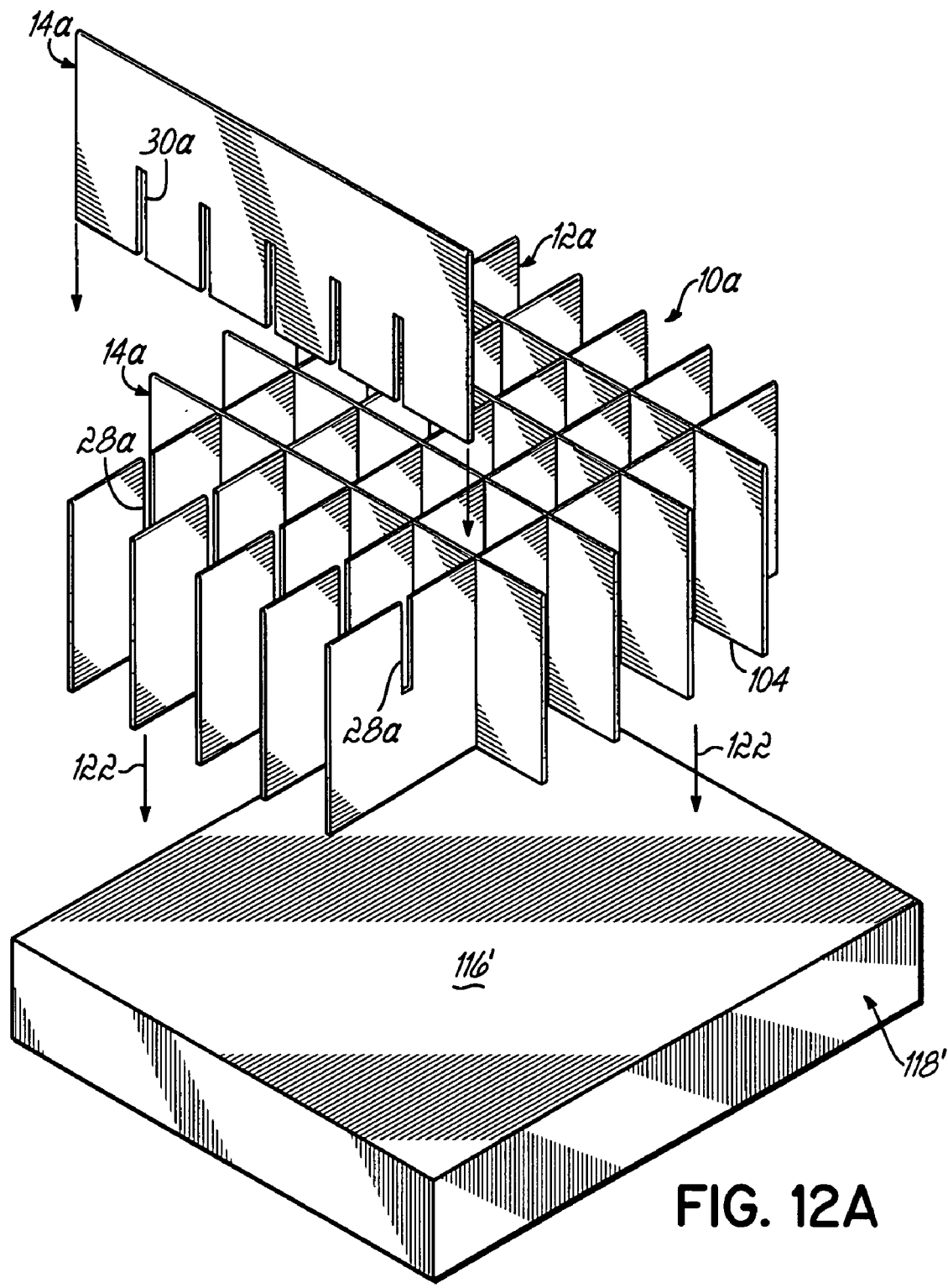
FIG. 12A is a perspective view of a partition assembly being assembled and lowered onto a hot plate.
Figure 12B:
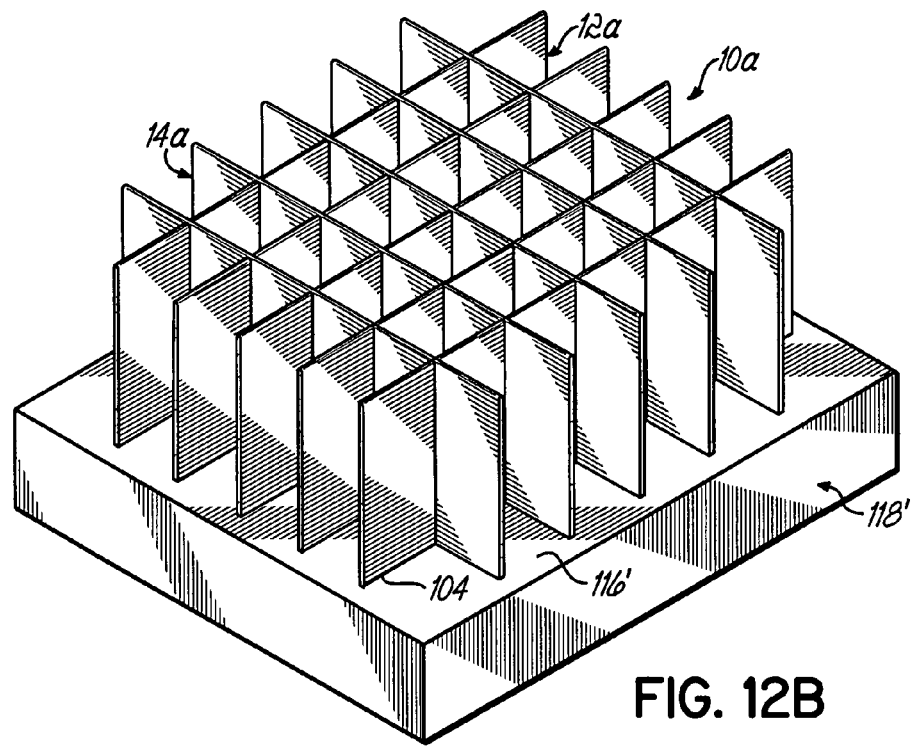
FIG. 12B is a perspective view of the partition assembly of FIG. 12A on the hot plate.
Figure 12C:
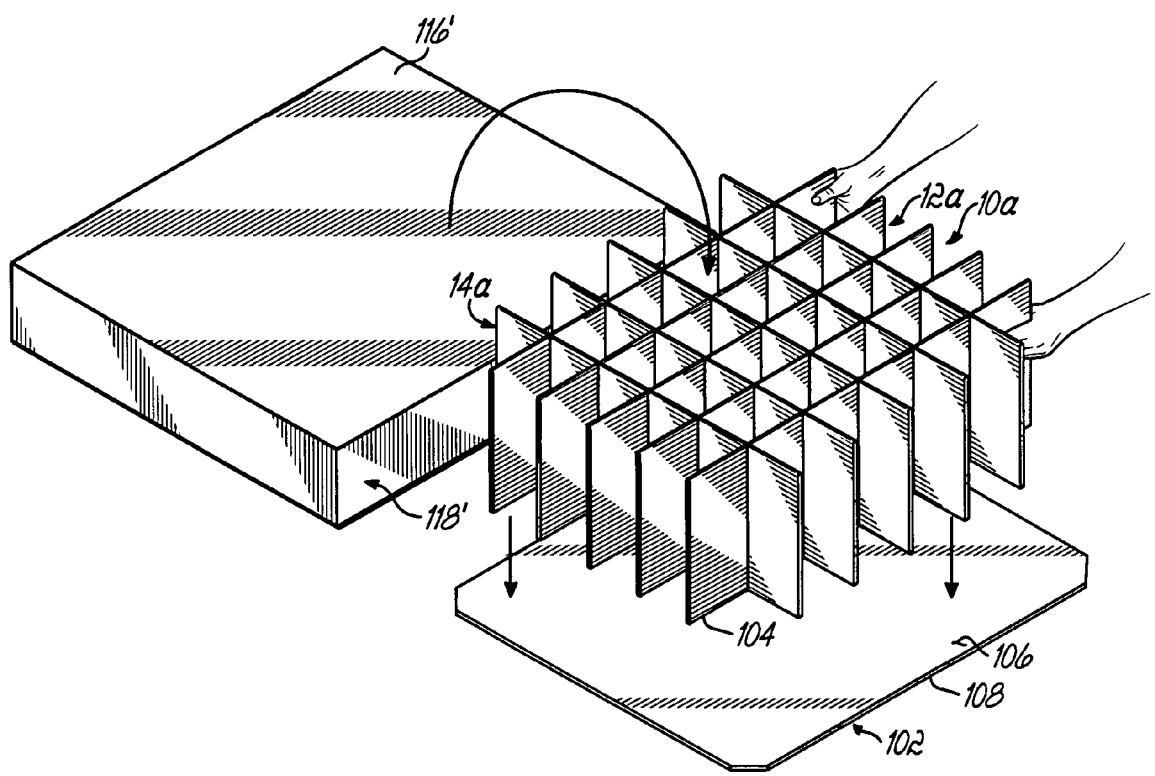
FIG. 12C is a perspective view of the partition assembly of FIG. 12C being removed from the hot plate and placed on a floor of a non-disassembling partition assembly.

FIGS. 12A-12C illustrate an alternative method of constructing a non-disassembling partition assembly such as those illustrated in FIGS. 6-8 and FIGS. 9-10. For simplicity, this method will be described with respect to the embodiment of non-disassembling partition assembly 100 shown in FIGS. 6-8.

As shown in FIG. 12A, the partition matrix 10a is assembled as described above and then lowered downwardly in the direction of arrows 122 onto a heated upper surface 116' of a hot plate 118' so that one edge 104 of the partition matrix 10a abuts the upper surface 116' of the hot plate 118'. Heat from the hot plate 118' melts or partially melts the edge 104 of the partition matrix 10a to a molten or partially molten state. See FIG. 12B.

As shown in FIG. 12C, the heated partition matrix 10a is removed from the hot plate 118 and placed on top of a piece of material which becomes the floor 102 so that the heated edge 104 of the partition matrix 10a abuts the upper surface 107 of the floor 102. Retained heat of the molten or semi-molten edge 104 of the partition matrix 10a partially melts the upper foam layer 106 of the floor 102. The floor 102 and partition matrix 10a are then allowed to cool, thereby permanently securing the first and second intersecting partitions 12a, 14a and permanently securing the floor 102 to the edge 104 of the partition matrix 10a. The floor 102 is thereby permanently attached to the bottom edge of the partition assembly 10a and forms a bottom or base for the complete assembly. This configuration of non-disassembling partition assembly with a bottom enables individual articles (not shown) placed inside the holding cells of the non-disassembling partition assembly 100 to be lifted out of a box or container with the non-disassembling partition assembly 100 when it is lifted out of a box or container.

Figure 13A:
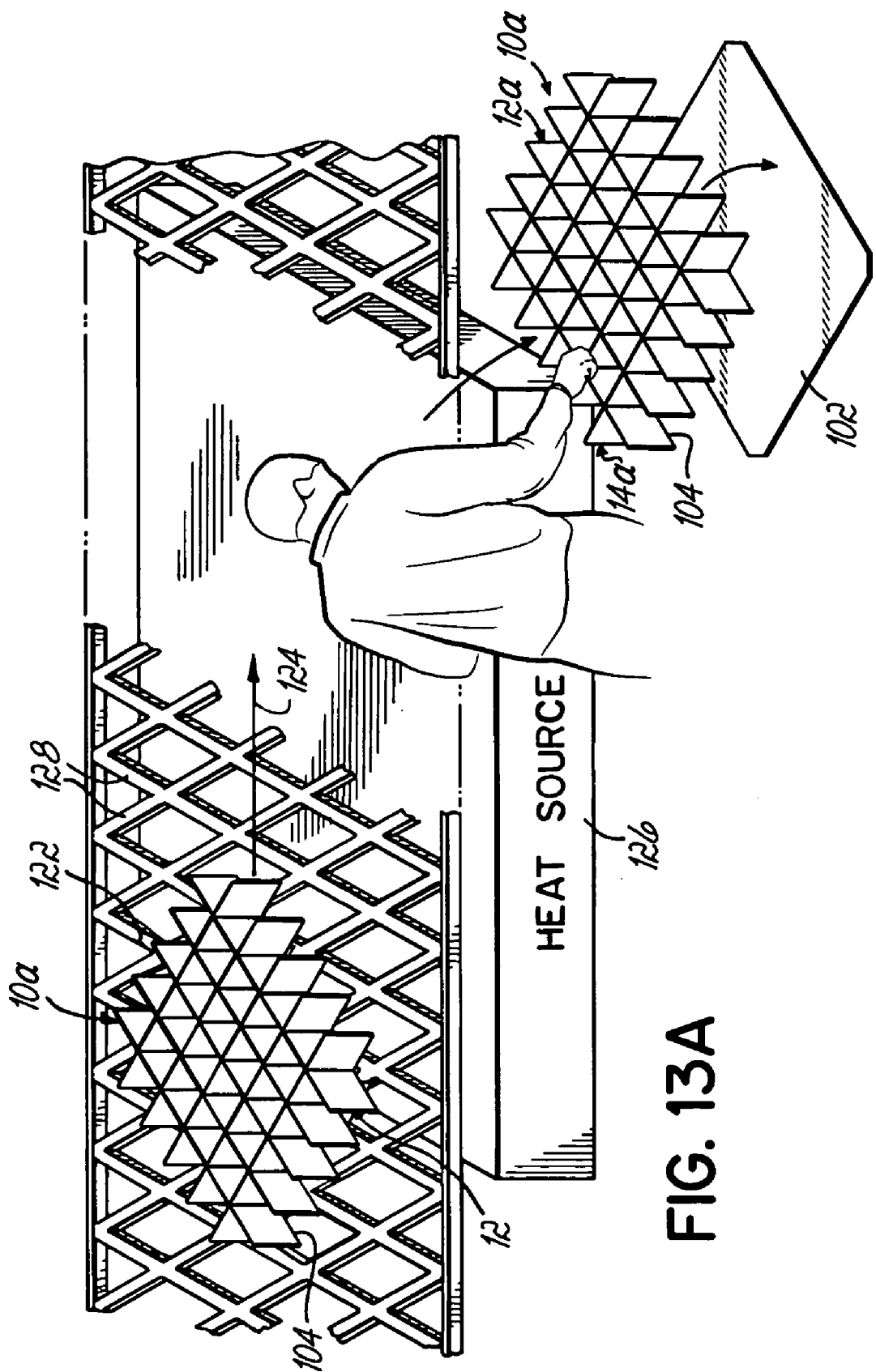
FIG. 13A is a perspective view of a partition assembly supported by a conveyor belt with the conveyor belt passing over a heat source to heat one edge of the partition assembly and of the heated partition assembly being removed from the conveyor and engaged with a floor to create a non-disassembling partition assembly.
Figure 13B:
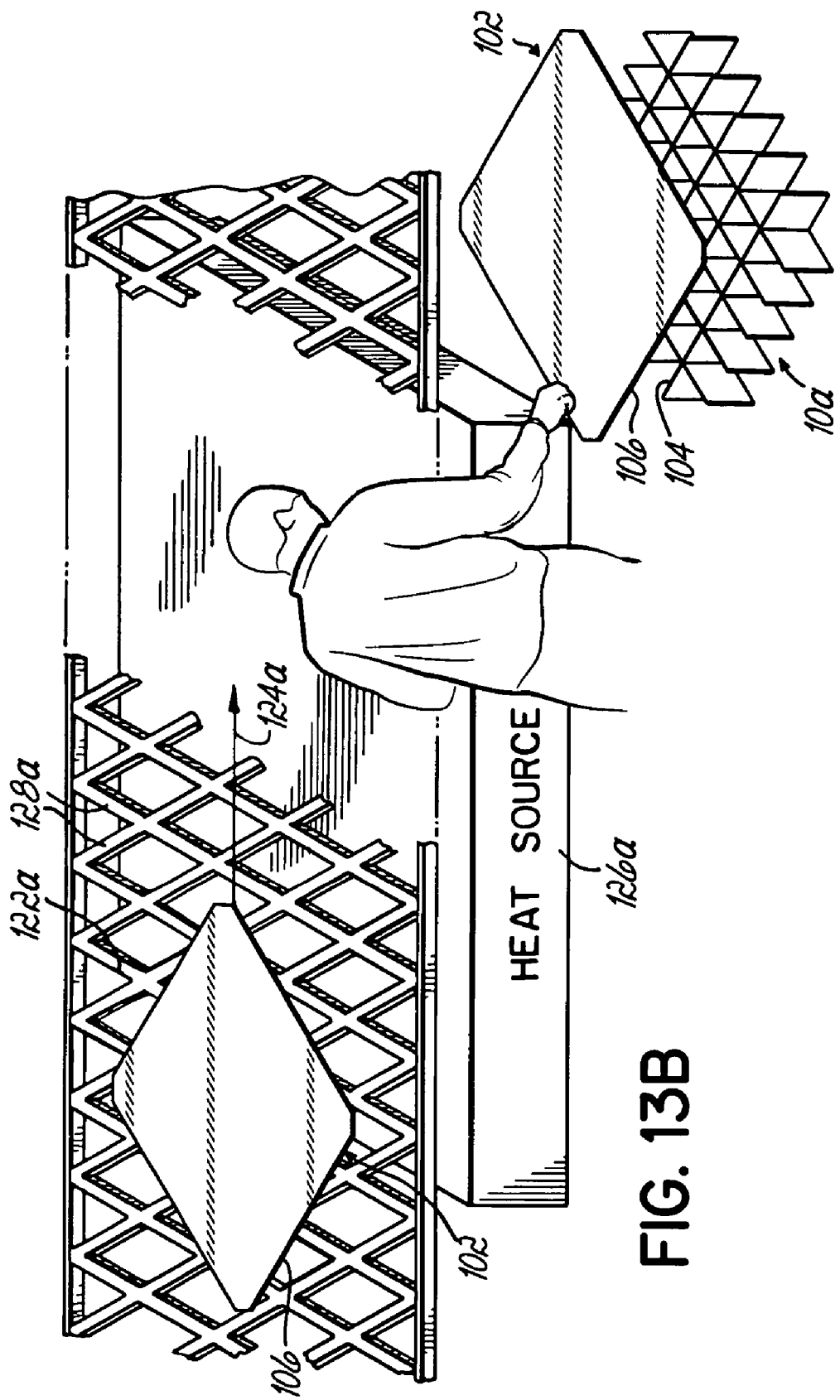
FIG. 13B is a perspective view of a floor supported by a conveyor belt with the conveyor belt passing over a heat source to heat one surface of the floor and of the heated floor being removed from the conveyor and engaged with a partition assembly to create a non-disassembling partition assembly.

FIGS. 13A and 13B illustrate other methods used to manufacture non-disassembling partition assemblies in accordance with the present invention. FIG. 13A illustrates a method whereby a partition matrix 10a is supported on a conveyor belt 122 which passes in the direction of arrow 124 allowing the matrix 10a to pass above a heat source 126. The conveyor belt 122 is made up of criss-crossing members, such as metal mesh 128 allowing heat from the heat source 126 to penetrate through the conveyor belt 122 and heat the lowermost edge 104 of the matrix 10a. This lower edge 104 of the matrix 10a (most proximate the heat source) is heated until the edges of the individual partitions become molten or semi-molten.

As the conveyor belt 122 moves the matrix 10a along in the direction of arrow 124, the matrix 10a is distanced from the heat source 126 and may be removed from the conveyor 122 while the edge 104 of the matrix 10a is still molten or semi-molten. The matrix 10a is then engaged with or placed on top of a floor 102. The floor 102 is attached to one edge of the partition assembly 10a while the heated edge 104 of the matrix 10a is still in a molten or semi-molten state. The floor 102 becomes permanently attached to the edge 104 of the partition matrix 10a when the edge 104 of the matrix 10a is allowed to cool, creating a plurality of parent welds 110 along the lower edges of slotted partitions 12a, 14a. The heat source 126 may be any source of sufficient heat, including but not limited to hot air, a radiant hew, or heat from a hot plate. Utilizing this method of manufacture, many partition assemblies may be made non-disassembling quickly, easily, and at a low cost without utilizing any additional material other than the material of the partitions themselves.

FIG. 13B illustrates another method whereby a floor 102 like those described above is supported on a conveyor belt 122a with its foam upper layer 106 on top. The floor 102 passes in the direction of arrow 124a allowing the floor 102 to pass above a heat source 126a. The conveyor belt 122a is made up of a criss-crossing members, such as metal mesh 128a allowing heat from the heat source 126a to penetrate through the conveyor belt 122a and heat the foam layer 106 of the floor 102. This foam layer 106 of the floor 102 is heated until the foam layer 106 of the floor 102 become molten or semi-molten.

As the conveyor belt 122a moves the floor 102 along in the direction of arrow 124a, the floor 102 is distanced from the heat source 126a and is removed from the conveyor 122 while the foam layer 106 of the floor 102 is still molten or semi-molten. The floor 102 is then engaged with or placed on top of a partition matrix 10a. The floor 102 is attached to one edge of the partition assembly 10a while the foam layer 106 of the floor 102 is still in a molten or semi-molten state. The floor 102 becomes permanently attached to the edge 104 of the partition matrix 10a when the foam layer 106 of the floor 102 is allowed to cool, creating a plurality of parent welds 110 along the intersections of the edges of slotted partitions 12a, 14a and the floor 102. The heat source 126a may be any source of sufficient heat, including but not limited to hot air, a radiant hew, or heat from a hot plate. Utilizing this method of manufacture, many partition assemblies may be made non-disassembling quickly, easily, and at a low cost without utilizing any additional material other than the material of the partitions themselves.

While we have described only a few embodiments of our invention, we do not intend to be limited except by the scope of the following claims.

What is claimed is:

1. A non-disassembling partition assembly comprising:
   at least one first slotted partition, each first slotted partition having at least one slot extending inwardly from an edge thereof;
   at least one second slotted partition, each second slotted partition having at least one slot extending inwardly from an edge thereof;
   said first and second slotted partitions being arranged in a matrix, said at least one slot of said at least one first slotted partition being engaged with said at least one slot of said at least one second slotted partition at an intersection;
   a floor including a foam layer, said matrix parent welded to said foam layer of said floor, wherein at least one of said partitions has a rounded upper edge and opposed plies welded together.

2. The partition assembly of claim 1 wherein said at least one of said partitions has a foam interior portion.

3. The partition assembly of claim 1 wherein said opposed plies are parent welded together.

4. The partition assembly of claim 1 wherein said at least one of said partitions is made of a multi-layered material.

5. A non-disassembling partition assembly comprising:
   at least one first slotted partition, each first slotted partition having at least one slot extending inwardly from an edge thereof;
   at least one second slotted partition, each second slotted partition having at least one slot extending inwardly from an edge thereof;
   said first and second slotted partitions being arranged in a matrix, said at least one slot of said at least one first slotted partition being engaged with said at least one slot of said at least one second slotted partition at an intersection;
   a floor including a foam layer, said matrix parent welded to said foam layer of said floor wherein said foam layer of the floor is polyolefin foam.

6. The partition assembly of claim 1 wherein said floor has an outer skin.

7. A non-disassembling partition assembly comprising:
   at least one first slotted partition, each first slotted partition having at least one slot extending inwardly from an edge thereof;
   at least one second slotted partition, each second slotted partition having at least one slot extending inwardly from an edge thereof;
   said first and second slotted partitions being arranged in a matrix, said at least one slot of said at least one first slotted partition being engaged with said at least one slot of said at least one second slotted partition at an intersection;
   a floor including a foam layer and an outer skin, said matrix parent welded to said foam layer of said floor, wherein said outer skin of the floor is a woven polyester material.

8. A non-disassembling partition assembly comprising:
   at least one first slotted partition, each first slotted partition having at least one slot extending inwardly from an edge thereof;
   at least one second slotted partition, each second slotted partition having at least one slot extending inwardly from an edge thereof;
   said first and second slotted partitions being arranged in a matrix, said at least one slot of said at least one first slotted partition being engaged with said at least one slot of said at least one second slotted partition at an intersection;
   a floor including a foam layer, said matrix parent welded to said foam layer of said floor, wherein said foam layer of the floor is parent welded to at least some of the partitions.

9. The partition assembly of claim 1 wherein all of said partitions have a foam interior.

10. A non-disassembling partition assembly comprising:
    a plurality of first slotted partitions, each first slotted partition having a plurality of slots extending inwardly from an edge thereof;
    a plurality of second slotted partitions, each second slotted partition having a plurality of slots extending inwardly from an edge thereof;
    said first and second slotted partitions being arranged in a matrix, said slots of said first slotted partitions being engaged with said slots of said second slotted partitions at intersections, at least one of said partitions having a foam interior portion and an outer skin secured to said foam interior portion; and a floor parent welded to said matrix, wherein said foam interior portion is two ply.

11. The partition assembly of claim 10 wherein said plies are secured together.

12. A non-disassembling partition assembly comprising:
a plurality of first slotted partitions, each first slotted partition having a plurality of slots extending inwardly from an edge thereof;
a plurality of second slotted partitions, each second slotted partition having a plurality of slots extending inwardly from an edge thereof;
said first and second slotted partitions being arranged in a matrix, said slots of said first slotted partitions being engaged with said slots of said second slotted partitions at intersections,
at least one of said partitions having a foam interior portion and an outer skin secured to said foam interior portion; and
a floor parent welded to said matrix, wherein each of said partitions has a rounded upper edge and opposed plies parent welded together.

13. The partition assembly of claim 12 wherein said partitions and said floor are made from the same material.

14. A non-disassembling partition assembly comprising:
a plurality of first slotted partitions, each first slotted partition having a plurality of slots extending inwardly from an edge thereof;
a plurality of second slotted partitions, each second slotted partition having a plurality of slots extending inwardly from an edge thereof;
said first and second slotted partitions being arranged in a matrix, said slots of said first slotted partitions being engaged with said slots of said second slotted partitions at intersections,
at least one of said partitions having a foam interior portion and an outer skin secured to said foam interior portion; and
a floor parent welded to said matrix, wherein said outer skin comprises a woven polyester.

15. A non-disassembling partition assembly comprising:
a plurality of first slotted partitions, each first slotted partition having a plurality of slots extending inwardly from an edge thereof;
a plurality of second slotted partitions, each second slotted partition having a plurality of slots extending inwardly from an edge thereof;
said first and second slotted partitions being arranged in a matrix, said slots of said first slotted partitions being engaged with said slots of said second slotted partitions at intersections,
at least one of said partitions having a foam interior portion and an outer skin secured to said foam interior portion; and
a floor parent welded to said matrix, wherein said foam interior portion is polyolefin foam.

16. A non-disassembling partition assembly comprising:
at least one first slotted partition, each first slotted partition having at least one slot extending inwardly from an edge thereof;
at least one second slotted partition, each second slotted partition having at least one slot extending inwardly from an edge thereof;
said first and second slotted partitions being arranged in a matrix, said at least one slot of said at least one first slotted partition being engaged with said at least one slot of said at least one second slotted partition at an intersection;
a floor including a foam layer and an outer skin, said matrix parent welded to said foam layer of said floor wherein said outer skin of the floor is plastic.

17. A non-disassembling partition assembly comprising:
at least one first slotted partition, each first slotted partition having at least one slot extending inwardly from an edge thereof;
at least one second slotted partition, each second slotted partition having at least one slot extending inwardly from an edge thereof;
said first and second slotted partitions being arranged in a matrix, said at least one slot of said at least one first slotted partition being engaged with said at least one slot of said at least one second slotted partition at an intersection;
a floor including a foam layer, said matrix parent welded to said foam layer of said floor, wherein each of the partitions has opposed plies parent welded together.

18. The partition assembly of claim 10 wherein said floor has an upper foam layer and an outer skin secured to a lower surface of the upper foam layer.

19. A non-disassembling partition assembly comprising:
a plurality of first slotted partitions, each first slotted partition having a plurality of slots extending inwardly from an edge thereof;
a plurality of second slotted partitions, each second slotted partition having a plurality of slots extending inwardly from an edge thereof;
said first and second slotted partitions being arranged in a matrix, said slots of said first slotted partitions being engaged with said slots of said second slotted partitions at intersections,
at least one of said partitions having a foam interior portion and an outer skin secured to said foam interior portion; and
a floor having a foam layer and an outer skin secured to a lower surface of the foam layer, said floor parent welded to said matrix, wherein said foam layer of said floor is a polyolefin foam.

20. A non-disassembling partition assembly comprising:
at least one first slotted partition, each first slotted partition having at least one slot extending inwardly from an edge thereof;
at least one second slotted partition, each second slotted partition having at least one slot extending inwardly from an edge thereof;
said first and second slotted partitions being arranged in a matrix, said at least one slot of said at least one first slotted partition being engaged with said at least one slot of said at least one second slotted partition at an intersection;
a floor including a foam layer, wherein said matrix is fused to said foam layer of said floor, wherein at least one of said partitions has a rounded upper edge and opposed plies parent welded together.

21. The partition assembly of claim 20 wherein at least one of said partitions has a foam interior portion and an outer skin secured to said foam interior portion.

22. The partition assembly of claim 20 wherein each of said partitions has a foam interior portion and an outer skin secured to said foam interior portion.

* * * * *